US008933412B2

(12) United States Patent
Fechner

(10) Patent No.: US 8,933,412 B2
(45) Date of Patent: Jan. 13, 2015

(54) INTEGRATED COMPARATIVE RADIATION SENSITIVE CIRCUIT

(75) Inventor: Paul S. Fechner, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 125 days.

(21) Appl. No.: 13/529,469

(22) Filed: Jun. 21, 2012

(65) Prior Publication Data
US 2013/0341521 A1 Dec. 26, 2013

(51) Int. Cl.
G01T 1/24 (2006.01)

(52) U.S. Cl.
USPC .................................. 250/370.14

(58) Field of Classification Search
USPC .................................. 250/370.14
See application file for complete search history.

(56) References Cited

U.S. PATENT DOCUMENTS

| | | | |
|---|---|---|---|
| 4,593,384 A | 6/1986 | Kleijne | |
| 5,117,457 A | 5/1992 | Comerford et al. | |
| 5,173,609 A | 12/1992 | Lacoste et al. | |
| 5,309,387 A | 5/1994 | Mori | |
| 5,389,738 A | 2/1995 | Piosenka et al. | |
| 5,596,199 A | 1/1997 | McNulty et al. | |
| 5,712,973 A | 1/1998 | Dayan et al. | |
| 6,246,970 B1 | 6/2001 | Silverbrook et al. | |
| 6,388,574 B1 | 5/2002 | Davis et al. | |
| 6,421,213 B1 | 7/2002 | Blyth | |
| 6,895,509 B1 | 5/2005 | Clark | |
| 7,188,282 B2 | 3/2007 | Walmsley | |
| 7,378,705 B2 | 5/2008 | Riekels et al. | |
| 7,472,305 B1 | 12/2008 | Hershman et al. | |
| 7,498,644 B2 | 3/2009 | Shapiro et al. | |
| 7,718,963 B2 | 5/2010 | Seefeldt et al. | |
| 7,795,087 B2 | 9/2010 | Roizin et al. | |
| 7,800,156 B2 | 9/2010 | Roizin | |
| 7,837,110 B1 | 11/2010 | Hess et al. | |
| 7,906,805 B2 | 3/2011 | Sadd et al. | |
| 7,978,556 B2 | 7/2011 | Macerola et al. | |

(Continued)

FOREIGN PATENT DOCUMENTS

KR 2010-0062652 6/2010

OTHER PUBLICATIONS

"In-Chip Anti-Tamper Sensor Technology (ICAT)" 6 pages, Feb. 6, 2009, downloadable from http://web.archive.org/web/20090401000000*/http://accordsol.com/icat.html.

(Continued)

Primary Examiner — David Porta
Assistant Examiner — Hugh H Maupin
(74) Attorney, Agent, or Firm — Shumaker & Sieffert, P.A.

(57) ABSTRACT

This disclosure is directed to devices, integrated circuits, and methods for sensing radiation. In one example, a device includes a radiation sensitive oscillator, configured to deliver a first output signal at intervals defined by a first oscillation frequency that alters in resistance in response to radiation. The device includes a reference oscillator, configured to deliver a reference output signal at a constant reference oscillation frequency. A controller records a first instance of the count from the radiation sensitive oscillator for a duration of time defined by the count from the reference counter; compares a second instance of the count from the radiation sensitive oscillator with the first instance of the count from the radiation sensitive oscillator; and performs a selected action in response to the second instance of the count from the radiation sensitive oscillator varying from the first instance of the count from the radiation sensitive oscillator.

19 Claims, 6 Drawing Sheets

(56) References Cited

U.S. PATENT DOCUMENTS

| | | |
|---|---|---|
| 2004/0017224 A1 | 1/2004 | Tumer et al. |
| 2006/0186342 A1* | 8/2006 | Burger et al. ............ 250/370.01 |
| 2007/0255966 A1 | 11/2007 | Condorelli et al. |
| 2008/0114582 A1 | 5/2008 | Leterrier et al. |
| 2010/0060562 A1* | 3/2010 | Hadwen et al. ............... 345/102 |
| 2010/0090714 A1 | 4/2010 | Van Geloven et al. |
| 2010/0096556 A1 | 4/2010 | Arsalan et al. |
| 2010/0132047 A1 | 5/2010 | Rodriguez et al. |
| 2010/0225380 A1 | 9/2010 | Hsu et al. |
| 2011/0147806 A1 | 6/2011 | Wilson et al. |

OTHER PUBLICATIONS

"In-Chip Anti-Tamper Sensor Technology (ICAT)" 6 pages, downloadable from http://accordsol.com/ICAT.html.

Neve et al., "Memories: A Survey of Their Secure Uses in Smart Cards," 10 pages, Second IEEE International Security in Storage Workshop, Oct. 2003.

Application Entitled "Integrated Radiation Sensitive Circuit," Filed Jun. 21, 2012.

Application Entitled "Integrated Cumulative Dose Radiation Sensor," Filed Jun. 21, 2012.

Notice of Allowance for U.S. Appl. No. 13/529,556, mailed Jul. 2, 2013, 10 pages.

* cited by examiner

INTEGRATED COMPARATIVE RADIATION SENSITIVE CIRCUIT

This disclosure relates to radiation sensors, and more particularly, to radiation sensors integrated with electronic systems.

BACKGROUND

In various applications, it is important to sense or measure any of various types of radiation to which a device or product has been exposed. This may be the case in electronic, medical, food safety, and space applications, for example. One application may be for assurance that medical devices or foods have received the correct dose of radiation to ensure that the medical device has been fully sterilized or that all pathogens leading to further degradation have been exterminated from the food. In addition, the ability to accomplish this function with a simple circuit and without the need for a power supply during the time of irradiation minimizes the expense associated with accomplishing this task.

SUMMARY

This disclosure is directed to devices, integrated circuits, and methods for sensing radiation and implementing responses to sensed radiation, including in an electronic system regardless of whether electronic system is powered or unpowered when it is exposed to radiation.

In one example, a device includes a first oscillator, configured to deliver a first output signal via a first oscillator output terminal at intervals defined by a first oscillation frequency. The first oscillator includes a radiation sensitive cell. The first oscillation frequency is based at least in part on a resistance of the radiation sensitive cell, and the radiation sensitive cell is configured for the resistance of the radiation sensitive cell to alter in response to incident radiation. The device further includes a first counter, connected to the first oscillator output terminal and configured to generate a first count of a number of times the first oscillator delivers the first output signal. The device further includes a reference oscillator, configured to deliver a reference output signal via a reference oscillator output terminal at intervals defined by a reference oscillation frequency. The device further includes a reference counter, connected to the reference oscillator output terminal and configured to generate a reference count of a number of times the reference oscillator delivers the reference output signal. The device further includes a controller, operably connected to the first counter and the reference counter. The device further includes a memory component, operably connected to the controller. The controller is configured to record in the memory component a first instance of the count from the first counter for a duration of time defined by the count from the reference counter; compare a second instance of the count from the first counter with the first instance of the count from the first counter; and perform a selected action in response to the second instance of the count from the first counter varying from the first instance of the count from the first counter by more than a selected threshold.

In another example, an integrated circuit includes a first oscillator, configured to deliver a first output signal via a first oscillator output terminal at intervals defined by a first oscillation frequency. The first oscillator includes a radiation sensitive cell. The first oscillation frequency is based at least in part on a resistance of the radiation sensitive cell, and the radiation sensitive cell is configured for the resistance of the radiation sensitive cell to alter in response to incident radiation. The integrated circuit further includes a first counter, connected to the first oscillator output terminal and configured to generate a first count of a number of times the first oscillator delivers the first output signal. The integrated circuit further includes a reference oscillator, configured to deliver a reference output signal via a reference oscillator output terminal at intervals defined by a reference oscillation frequency. The integrated circuit further includes a reference counter, connected to the reference oscillator output terminal and configured to generate a reference count of a number of times the reference oscillator delivers the reference output signal. The integrated circuit further includes a controller, operably connected to the first counter and the reference counter. The integrated circuit further includes a memory component, operably connected to the controller. The controller is configured to record in the memory component a first instance of the count from the first counter for a duration of time defined by the count from the reference counter; compare a second instance of the count from the first counter with the first instance of the count from the first counter; and perform a selected action in response to the second instance of the count from the first counter varying from the first instance of the count from the first counter by more than a selected threshold.

In another example, a method includes delivering a first output signal from a first oscillator via a first oscillator output terminal at intervals defined by a first oscillation frequency. The first oscillator includes a radiation sensitive cell. The first oscillation frequency is based at least in part on a resistance of the radiation sensitive cell, and the radiation sensitive cell is configured for the resistance of the radiation sensitive cell to alter in response to incident radiation. The method further includes generating a first count of a number of times the first oscillator delivers the first output signal. The method further includes delivering a reference output signal from a reference oscillator via a reference oscillator output terminal at intervals defined by a reference oscillation frequency. The method further includes generating a reference count of a number of times the reference oscillator delivers the reference output signal. The method further includes recording a first instance of the count from the first counter for a duration of time defined by the count from the reference counter. The method further includes comparing a second instance of the count from the first counter with the first instance of the count from the first counter. The method further includes performing a selected action in response to the second instance of the count from the first counter varying from the first instance of the count from the first counter by more than a selected threshold.

The details of one or more examples are set forth in the accompanying drawings and the description below. Other features, objects, and advantages will be apparent from the description and drawings, and from the claims.

DETAILED DESCRIPTION

Some of the examples described in the disclosure may be directed to a devices, integrated circuits, and methods for a radiation sensor. In various examples, a radiation sensor as described herein may be implemented entirely in complementary metal-oxide-semiconductor (CMOS) circuitry that may be incorporated in any CMOS integrated circuit. In various examples, an integrated radiation sensor as described herein may sense and record the incidence of one or more selected types of radiation on an integrated circuit at all times, whether or not the integrated circuit is powered. In various examples, an integrated circuit incorporating an integrated radiation sensor as described herein, when it is powered up or at any time thereafter, may automatically detect the recorded incidence of radiation as indicated by the radiation sensor, and perform a selected action in response to the recorded incidence of radiation as indicated by the radiation sensor.

For example, in various implementations, the integrated circuit may respond to a certain recorded incidence of radiation by the integrated radiation sensor by providing a signal indicating whether or not the integrated circuit has been exposed to more than a selected dose of radiation. This signal may either be transmitted off chip via an RF transmitter in a manner similar to RF ID circuits or used on chip to initiate a user-defined function. A radiation sensor may be implemented as a portion of a larger integrated circuit, and may therefore be implemented with small size, low mass, and low cost, in various examples.

Figure 1:
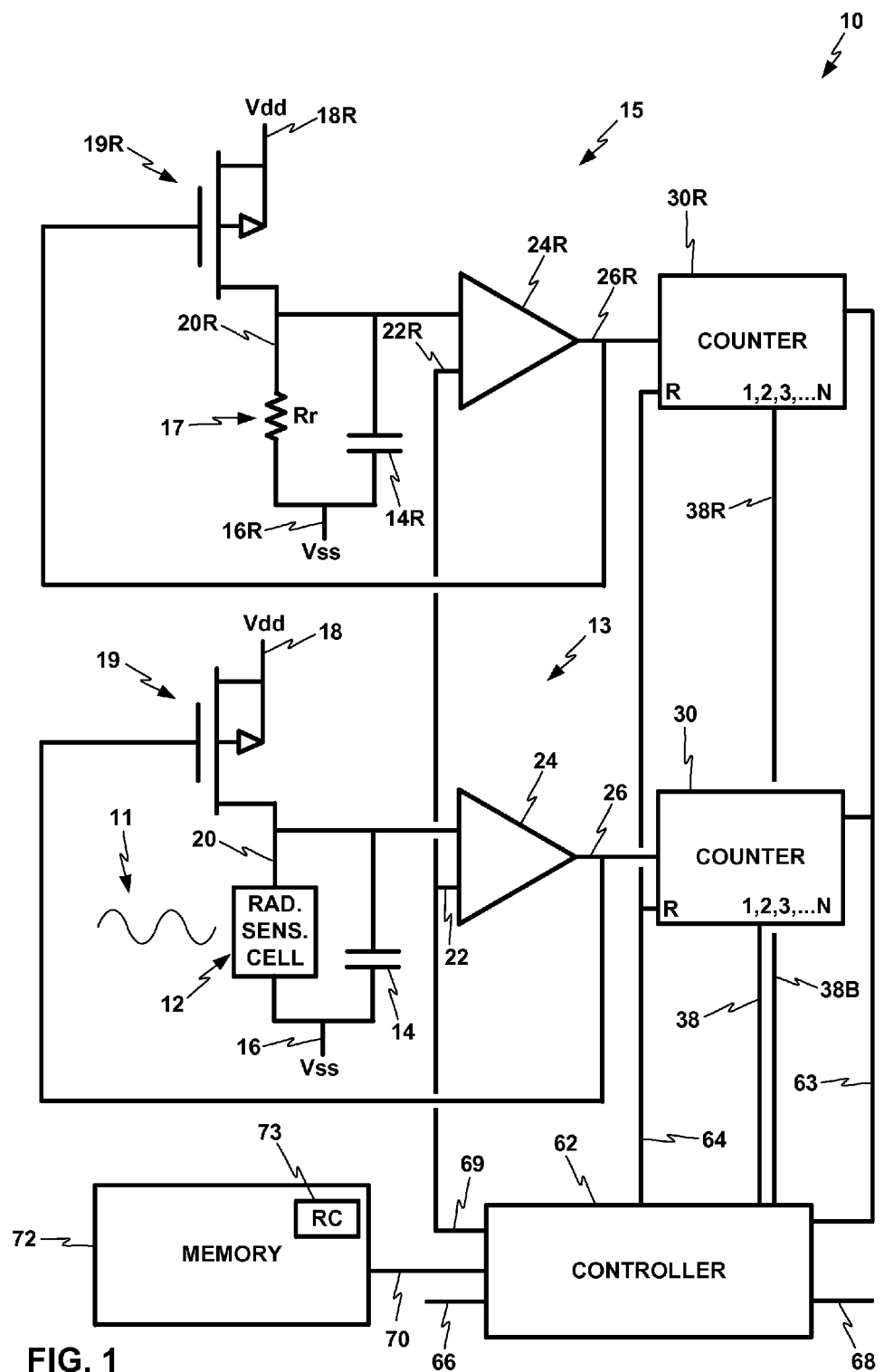
FIG. 1 is a circuit diagram of an illustrative example of a radiation sensitive circuit device of this disclosure.

FIG. 1 is a circuit diagram of an illustrative example of a radiation sensor device 10 of this disclosure. Radiation sensor device 10 includes a radiation sensitive oscillator 13 and a reference oscillator 15. Radiation sensitive oscillator 13 includes a radiation sensitive cell 12 that alters in resistance in response to incident radiation. Radiation sensitive oscillator 13 has an oscillation frequency that alters as a function of the resistance of radiation sensitive cell 12, so that the oscillation frequency of radiation sensitive oscillator 13 also alters in response to radiation incident on radiation sensitive cell 12. Reference oscillator 15 includes a reference resistor 17 that maintains a constant resistance and is unaffected by incident radiation. Reference oscillator 15 has an oscillation frequency that is partly a function of the resistance of reference resistor 17, so that the oscillation frequency of reference oscillator 15 is maintained at a constant frequency and is also unaffected by incident radiation.

Radiation sensor device 10 also includes a counter 30 connected to an oscillator output terminal 26 of the radiation sensitive oscillator 13, and a counter 30R connected to an oscillator output terminal 26R of the reference oscillator 15. Counters 30 and 30R may each be configured to maintain and store a cumulative count of how many times the radiation sensitive oscillator 13 and the reference oscillator 15 respectively have delivered their output signals. Radiation sensor device 10 may thereby be configured to count the number of times the radiation sensitive oscillator 13 delivers its radiation indicative output signal, and to count the number of times the reference oscillator 15 delivers its reference output signal.

Radiation sensor device 10 also includes a controller 62 connected to counters 30 and 30R, and a memory component 72 connected to the controller 62. Radiation sensor device 10 may make an initial reading of the counts from counters 30 and 30R from radiation sensitive oscillator 13 and reference oscillator 15 respectively, record these instances of the counts from radiation sensitive oscillator 13 and reference oscillator 15 in a reference count store 73 in memory component 72, and use these stored instances of the counts from counters 30 and 30R as a basis for comparison with subsequent readings of the counts from radiation sensitive oscillator 13 and reference oscillator 15. Counters 30 and 30R thereby function as analog-to-digital converters, to translate the analog oscillating voltages of the radiation sensitive oscillator 13 and reference oscillator 15 into a digital signal to communicate to controller 62.

For example, controller 62 may activate both radiation sensitive oscillator 13 and reference oscillator 15 at the same time, and wait for a selected count number by the reference counter 30R from reference oscillator 15. Once the controller 62 detects that it has received the selected count number from reference counter 30R, controller 62 may signal the counter 30 for the radiation sensitive oscillator 13 to stop counting the output signal from radiation sensitive oscillator 13. Controller 62 may then record the count from the reference counter 30R from reference oscillator 15 and the count from the counter 30 for the radiation sensitive oscillator 13 together in reference count store 73 in memory component 72.

Since the reference oscillator 15 has a constant oscillation frequency, the count from reference oscillator 15 via counter 30R may be used as a timer for indicating a selected passage of time, and the controller 62 may compare the count output from radiation sensitive oscillator 13 against the selected passage of time indicated by reference oscillator 15, for initial and subsequent instances of receiving a count from radiation sensitive oscillator 13. Controller 62 may determine the current oscillation frequency of radiation sensitive oscillator 13 for any individual instance of reading the count from radiation sensitive oscillator 13 by comparing the count with the selected passage of time indicated by reference oscillator 15. Reference oscillator 15 may serve as an advantageous basis of reference for the selected passage of time since it may be incorporated together in a single integrated circuit with radiation sensitive oscillator 13, and incorporate many analogous components as radiation sensitive oscillator 13, and provide a timer function that is independent of a chip clock or other external timer that may not be available in very simple circuit configurations.

Reference oscillator 15 may thereby serve as an inbuilt timer or basis of comparison for radiation sensitive oscillator 13. The count generated by reference oscillator 15 in tandem with the count generated by radiation sensitive oscillator 13 may be independent of any chip clock or timer external to radiation sensor device 10. Reference oscillator 15 may thereby provide an inherently reliable and independent self-referencing basis of comparison for radiation sensitive oscillator 13, in this example.

Controller 62 may record the count from the reference counter 30R from reference oscillator 15 and the count from the counter 30 for the radiation sensitive oscillator 13 together in reference count store 73 in memory component 72 for one or more initial instances of these counts, and refer to these instances as a basis for comparison for one or more subsequent instances of counts from either or both of the radiation sensitive oscillator 13, the reference oscillator 15. For example, the controller 62 may activate radiation sensitive oscillator 13 and reference oscillator 15 for an initial count as part of the final process of manufacturing an integrated circuit or other device that incorporates radiation sensor device 10, and record these initial instances of the counts from the radiation sensitive oscillator 13 and reference oscillator 15 in the reference count store 73 in memory component 72.

At a certain point thereafter, the controller 62 may activate the radiation sensitive oscillator 13 and the reference oscillator 15 once again to generate new instances of these counts, and controller 62 may then compare at least the new instance of the count from radiation sensitive oscillator 13 with the previously recorded instance of the count from radiation sensitive oscillator 13. Controller 62 may access the previously recorded instance of the count for reference oscillator 15 to use as a reference count with which to compare the new counts. That is, controller 62 may access the previously recorded instance of the count for reference oscillator 15 and, to generate the new counts, controller 62 may activate radiation sensitive oscillator 13 and reference oscillator 15 to run until the new count from reference oscillator 15 matches the recorded instance of the count from reference oscillator 15.

Once the new count from reference oscillator 15 matches the recorded instance of the count from reference oscillator 15, controller 62 may then stop the count for counter 30 for radiation sensitive oscillator 13, thereby finalizing a new instance of the count for radiation sensitive oscillator 13. The new instance of the count for radiation sensitive oscillator 13 is taken for the same duration of time as the recorded initial instance of the count for radiation sensitive oscillator 13, as determined by reference oscillator 15. Controller 62 may then compare this new instance of the count for radiation sensitive oscillator 13 with the previously or initially recorded instance of the count for radiation sensitive oscillator 13. Controller 62 may make this comparison to determine whether the new instance of the count for radiation sensitive oscillator 13 is different from the previously or initially recorded instance of the count for radiation sensitive oscillator 13, or if the new instance of the count for radiation sensitive oscillator 13 is different from the previously or initially recorded instance of the count for radiation sensitive oscillator 13 by at least a selected threshold.

If controller 62 determines that the new instance of the count for radiation sensitive oscillator 13 is varied or altered from the previously or initially recorded instance of the count for radiation sensitive oscillator 13, either at all, or by at least a selected threshold, controller 62 may then perform a selected action in response to the new instance of the count from counter 30 for radiation sensitive oscillator 13. The selected action the controller 62 may perform may include signaling to another component of a device or to a user output interface that the newly measured oscillation frequency is altered from the initial or previously measured oscillation frequency by more or less than the selected threshold, for example thereby verifying sufficient radiation to accomplish the desired purpose.

Radiation sensitive cell 12 may be sensitive to any one or more of a variety of types, frequencies, energies, or wavelengths of radiation, such as example incident radiation wave 11. Radiation sensitive cell 12 may have or be set to an initial electrical resistance, and may vary in resistance in response to radiation 11 incident on radiation sensitive cell 12, for radiation of an energy to which radiation sensitive cell 12 is sensitive. Radiation sensitive cell 12 may vary in resistance cumulatively in response to incident radiation in that radiation sensitive cell 12 varies in resistance proportionally to the amount of radiation that strikes radiation sensitive cell 12, for at least a certain amount of radiation and over at least a certain range of resistance.

For example, radiation sensitive cell 12 may be set to an initial resistance, and then, if radiation sensitive cell 12 is exposed to a first dose of radiation, its resistance may change to a second value of resistance. If radiation sensitive cell 12 is later exposed to a second dose of radiation, its resistance may change to a third value of resistance, and so on. If one of the doses of radiation has a longer duration or higher intensity, or otherwise has a higher total energy, the resistance of radiation sensitive cell 12 may change by a proportionally greater amount.

The rate of change of resistance of radiation sensitive cell 12 in response to incident radiation is not necessarily the same across its entire range of variability, i.e., the rate of change of resistance may increase or decrease in response to the same dose of radiation depending on where in the range of variability the resistance is, in some examples. Oscillator 13 may include additional circuitry to compensate for any such variation in response across the response range, or controller 62 may include logic or programming code that compensates or accounts for any such variation in response across the response range, in some examples.

Radiation sensitive cell 12 may be sensitive to any one or more of a variety of types, frequencies, energies, or wavelengths of radiation. For example, radiation sensitive cell 12 may be sensitive to electromagnetic (EM) radiation having energies of approximately 1.1 electron-volts (eV) or higher, i.e., wavelengths of approximately 1.1 microns or less. This corresponds to mid-near-infrared wavelengths or shorter, with shorter wavelength radiation including ultraviolet, X-ray, or gamma ray wavelengths. In other examples, radiation sensitive cell 12 may be sensitive to electromagnetic (EM) radiation having energies of approximately 1.6 electron-volts (eV) or higher, i.e., wavelengths of approximately 750 nanometers or less, i.e., visible wavelengths or shorter, with shorter wavelength radiation including ultraviolet, X-ray, or gamma ray wavelengths. In other examples, radiation sensitive cell 12 is not sensitive to visible wavelengths but is sensitive to EM radiation of ultraviolet or higher energies, i.e., approximately 3.3 eV or higher.

In still other examples, radiation sensitive cell 12 may be sensitive only to EM radiation of X-ray or higher energy, i.e., approximately 120 eV or higher; or only to EM radiation of hard X-ray or higher energy, i.e., approximately 12 kilo-electron-volts (keV) or higher. In still other examples, radiation sensitive cell 12 may be selectively sensitive to certain ranges of wavelengths with upper and lower bounds. For example, radiation sensitive cell 12 may be selectively sensitive only to visible wavelengths, or only near-infrared, visible, and ultraviolet wavelengths, but not to radiation having wavelengths shorter or longer than within that range. In still other examples, radiation sensitive cell 12 may be sensitive to any other range or combination of ranges of wavelengths. Radiation sensitive cell 12 may or may not also be sensitive to other types of radiation besides electromagnetic, such as non-electromagnetic cosmic rays, for example.

Radiation sensitive oscillator 13 also includes a ground terminal 16 and a cell output terminal 20 that are both connected to the radiation sensitive cell 12, in the example of FIG. 1. Cell output terminal 20 may be configured to vary in voltage in response to the resistance of the radiation sensitive cell 12. In particular, cell output terminal 20 may be connected to source voltage terminal 18 through a MOSFET transistor 19, and in particular, through the source and drain terminals of MOSFET transistor 19. Radiation sensitive oscillator 13 further includes capacitor 14 and comparator 24 which, together with radiation sensitive cell 12 and MOSFET transistor 19, implement an oscillating output signal provided from comparator 24. The output signal may be attributed at a specific level to the comparator 24 itself, or at a more general level, to radiation sensitive cell oscillator 13.

In particular, capacitor 14 may also be connected between the ground terminal 16 and the cell output terminal 20 in parallel with the radiation sensitive cell 12. Cell output terminal 20 is also connected to comparator 24. Comparator 24 includes a first input terminal connected to cell output terminal 20, a second input terminal 22, and a comparator output terminal 26. The second input terminal 22 is connected to a threshold voltage, so that the comparator 24 is configured to deliver an output signal via the comparator output terminal 26 in response to the voltage of the cell output terminal 20 reaching the threshold voltage on second input terminal 22.

The gate terminal of MOSFET transistor 19 may also be connected to the comparator output terminal 26. The MOSFET transistor 19 may thereby be configured to vary the resistance between source voltage terminal 18 and cell output terminal 20 in response to the output signal from comparator 24. This completes a feedback system that configures MOSFET transistor 19, radiation sensitive cell 12, capacitor 14, and comparator 24, together with their connections to each other and to source voltage terminal 18 and ground terminal 16 as shown in FIG. 1, to act as a radiation sensitive oscillator 13.

In particular, MOSFET transistor 19 may be implemented as a P-channel MOSFET in this example. When radiation sensor device 10 is initially powered up and the source voltage at source voltage terminal 18 is initially set to the source voltage Vdd, the gate terminal of MOSFET transistor 19 is at a low voltage, so P-channel MOSFET transistor 19 applies a low resistance between source voltage terminal 18 and cell output terminal 20. With this low-resistance connection between source voltage terminal 18 and cell output terminal 20, the voltage of cell output terminal 20 rises toward the source voltage. Radiation sensitive cell 12 applies a given initial resistance, and as the voltage of cell output terminal 20 increases, capacitor 14 accumulates charge. The voltage of cell output terminal 20 increases as the charge on capacitor 14 increases, and after a time, the rising voltage of cell output terminal 20 reaches the same voltage as the threshold voltage on second input terminal 22.

When the voltage of cell output terminal 20 reaches the same voltage as the threshold voltage on second input terminal 22, this induces the comparator 24 to deliver the output signal via comparator output terminal 26. The output signal may take the form of or include a rise in voltage on comparator output terminal 26, which comparator output terminal 26 applies to the gate terminal of MOSFET transistor 19, thereby increasing the resistance of the gate terminal of MOSFET transistor 19. This increase in the resistance of the gate terminal of MOSFET transistor 19 isolates cell output terminal 20 from the source voltage on source voltage terminal 18, and enables the charge that has accumulated on capacitor 14 to dissipate through radiation sensitive cell 12 to the ground terminal 16. The charging time of cell output terminal 20 may be relatively more rapid than the reaction time of comparator 24, so that the voltage on cell output terminal 20 may rise to at or near the source voltage Vdd before the reaction of comparator 24 and MOSFET transistor 19 cuts off cell output terminal 20 from source voltage terminal 18 and begins the dissipation of charge from capacitor 14 and cell output terminal 20 through radiation sensitive cell 12, in this example.

With the dissipation of the charge on capacitor 14, the voltage on cell output terminal 20 decreases below the threshold voltage on second input terminal 22, which may induce the comparator 24 to stop delivering the output signal via comparator output terminal 26. This may thereby induce a decrease in voltage on the gate terminal of MOSFET transistor 19. As the voltage on the gate terminal of MOSFET transistor 19 decreases, the resistance of MOSFET transistor 19 also decreases, and the source voltage from source voltage terminal 18 once again has a low-resistance connection to cell output terminal 20. The voltage on cell output terminal 20 once again increases. This process thereby begins to repeat itself, with capacitor 14 once again accumulating charge as the voltage of cell output terminal 20 increases.

The various elements described above that make up radiation sensitive oscillator 13 therefore configure the voltage on cell output terminal 20 to oscillate. This oscillation drives the comparator 24 to deliver the output signal on comparator output terminal 26 at regular, periodic intervals defined by an oscillation frequency of the radiation sensitive oscillator 13. Radiation sensor device 10 thereby includes a radiation sensitive oscillator 13 configured to deliver an output signal, i.e. the comparator output signal, via oscillator output terminal 26 at intervals defined by the oscillation frequency of the radiation sensitive oscillator 13, in the example of FIG. 1.

In the example of FIG. 1, source voltage terminal 18 is labeled "Vdd" and ground voltage terminal 16 is labeled "Vss" in keeping with standard CMOS convention, though radiation sensor device 10 may also be implemented in non-CMOS technologies. Ground voltage terminal 16 is not necessarily at ground, but may be at a lower voltage than source voltage terminal 18. In other examples, ground voltage terminal 16 and source voltage terminal 18 may also be reversed.

The oscillation frequency of radiation sensitive oscillator 13 may be precisely defined by the components of radiation sensitive oscillator 13, such that radiation sensitive oscillator 13 may track a passage of time to high precision while radiation sensor device 10 is powered. Radiation sensitive oscillator 13 may also be configured with the capability to vary its oscillation frequency, as a function of the radiation sensitive cell 12. In particular, radiation sensitive oscillator 13 may be configured with the capability to vary its oscillation frequency as a function of the radiation sensitive cell 12 being exposed to incident radiation.

In particular, radiation sensitive cell 12 may be configured to vary its resistance, i.e. the resistance it applies between ground terminal 16 and cell output terminal 20, in response to intercepting radiation incident on radiation sensitive cell 12. As the resistance of radiation sensitive cell 12 varies, this also varies both the rate of charge accumulation on capacitor 14 when MOSFET transistor 19 is in its low-resistance state, and the rate of charge dissipation from capacitor 14 when MOSFET transistor 19 is in its high-resistance state. In this way, because the resistance of the radiation sensitive cell 12 is configured to vary in response to incident radiation, the oscillation frequency of oscillator 13 also varies based at least in part on the resistance of the radiation sensitive cell 12.

Radiation sensitive oscillator 13 thereby varies its oscillation rate based on radiation incident on radiation sensitive oscillator 13, or in particular, based on radiation incident on radiation sensitive cell 12. Counter 30 maintains a count of a number of times radiation sensitive oscillator 13 delivers its output signal, and may communicate instances of this count to controller 62. Controller 62 may also receive instances of a count from reference counter 30R, based on counts from reference oscillator 15, and compare an instance of a count from radiation sensitive oscillator 13 received via counter 30 with a corresponding instance of a count from reference oscillator 15 received via counter 30R. Controller 62 may also record these corresponding count instances from radiation sensitive oscillator 13 and reference oscillator 15 in reference count store 73 in memory component 72. By this means, controller 62 may detect and/or record indications of radiation incident on radiation sensor device 10.

Reference count store 73 may be any entry, data structure, or stored data in memory component 72 where controller 62 records instances of readings from radiation sensitive oscillator 13 and/or reference oscillator 15, using any type of database, data structure, or other type of data storage software or mechanism. Reference count store 73 may refer to any volatile or non-volatile instance of data from radiation sensitive oscillator 13 and/or reference oscillator 15 being stored or recorded.

Reference oscillator 15 may be identical or similar to radiation sensitive oscillator 13 other than having a reference resistor 17 that applies a constant resistance Rr, and may be unaffected by incident radiation. Similarly to radiation sensitive oscillator 13, reference oscillator 15 also includes a source voltage terminal 18R, a ground terminal 16R, a MOSFET transistor 19R, a capacitor 14R, a comparator 24R, and a comparator output terminal 26R. Reference resistor 17 and capacitor 14R may both be connected in parallel between ground terminal 16R and a resistor output terminal 20R. Resistor output terminal 20R may be connected to source voltage terminal 18R through the source and drain terminals of MOSFET transistor 19, and comparator output terminal 26R may be connected to the gate terminal of MOSFET transistor 19R, configuring these various elements to function as an oscillator, i.e. as reference oscillator 15, and to generate an output signal at an oscillation frequency via comparator output terminal 26R. This oscillation frequency of the output signal from reference oscillator 15 remains constant since reference resistor 17 is not radiation sensitive and none of the components of reference oscillator 15 vary in their physical characteristics in normal operation, whether or not any incident radiation occurs.

Reference oscillator 15 may thereby respond to source voltage Vdd applied via source voltage terminal 18R and ground (or ground voltage) applied via ground terminal 16R in a similar manner as discussed above with reference to radiation sensitive oscillator 13, other than in terms of being radiation sensitive and altering in response to radiation. For example, in reference oscillator 15, the voltage on resistor output terminal 20R may oscillate at a constant rate as charge accumulates and dissipates on capacitor 14R and the voltage on the gate terminal of MOSFET transistor 19 increases and decreases the resistance of MOSFET transistor 19. The output terminal of reference oscillator 15, i.e., comparator output terminal 26R, is also connected to its own counter 30R, which may count each output signal from reference oscillator 15. Counter 30R may communicate one or more instances of a count from reference oscillator 15 to controller 62 via terminal 38R. Counter 30R may deliver a reference count for a corresponding count simultaneously counted by counter 30 for radiation sensitive oscillator 13.

The output signal from reference oscillator 15 may thereby function as a reliable reference for comparison with an output signal from radiation sensitive oscillator 13 provided at the same time. Reference oscillator 15 may serve as a particularly valuable comparison reference for radiation sensitive oscillator 13 since reference oscillator 15 may be identical to radiation sensitive oscillator 13 other than by including a constant reference resistor 17 instead of radiation sensitive cell 12. Reference oscillator 15 may also serve as a particularly valuable comparison reference for radiation sensitive oscillator 13 since reference oscillator 15 may be isolated from a general chip clock or other external timer, and may have its source voltage terminal 18R and its ground terminal 16R directly connected to the same source voltage and ground infrastructure as source voltage terminal 18 and its ground terminal 16 of radiation sensitive oscillator 13. For reference oscillator 15 and radiation sensitive oscillator 13 to share these components and connections in common may help ensure that radiation is measured accurately by radiation sensor device 10.

In other examples, any kind of oscillator that maintains an oscillation frequency that is not affected by incident radiation may be included in place of the specific details shown in FIG. 1 for reference oscillator 15.

Additionally, while the example described above discusses the oscillation rate of reference oscillator 15 as being constant and not sensitive to radiation, it will be understood that these design goals may hold under a wide range of circumstances while no longer being valid under certain extreme circumstances or environments. For example, an extremely intense bombardment by X-rays, gamma rays, alpha rays, or cosmic rays, or an extremely intense electromagnetic pulse, may penetrate a circuit that includes reference oscillator 15 and distort or alter the physical properties of reference resistor 17, MOSFET transistor 19R, or any of the circuit elements of reference oscillator 15, and either alter the oscillation frequency of the output signal of reference oscillator 15 or even destroy the capability of reference oscillator 15 to function. For example, such an extreme occurrence may induce overheating or melting of reference resistor 17 or permanent dielectric breakdown in MOSFET transistor 19R or capacitor 14R.

It will be understood however that the possibility of these extreme occurrences does not invalidate the description herein of reference resistor 17 and reference oscillator 15 as being constant and not sensitive to incident radiation, within a very wide range of normal and even relatively extreme operating circumstances and environments. Reference oscillator 15 may also be implemented with various grades of shielding and/or radiation-hardened circuit elements, such as may be specialized for aerospace applications, to extend the extremes of operating circumstances and environments in which reference oscillator 15 remains reliably insensitive to radiation and constant in its oscillation frequency. Those in the art will recognize therefore that the description herein of reference oscillator 15 being insensitive to radiation and constant in its oscillation frequency while radiation sensitive oscillator 13 alters its oscillation frequency in response to radiation may remain valid and applicable within an extremely wide range of operating circumstances and environments.

Radiation sensitive cell 12 may be configured to alter its resistance based on incidence of radiation regardless of whether radiation sensor device 10 is powered or unpowered at the time radiation strikes radiation sensor device 10. That is, radiation sensitive oscillator 13 may have an initial oscillation frequency that may be measured and recorded in reference count store 73 in memory component 72, along with a corresponding output from reference oscillator 15, and radiation sensor device 10 may then be powered down for a period of time, thereby minimizing power consumption. Radiation sensor device 10 may then be exposed to radiation at some point while it is unpowered, such that this incident radiation strikes radiation sensitive cell 12. Radiation sensitive cell 12 may alter its resistance in response to this incident radiation, while radiation sensor device 10 is unpowered.

Radiation sensor device 10 may then, at a later point in time, be powered up again. This powering up of radiation sensor device 10 may activate radiation sensitive oscillator 13, thereby inducing radiation sensitive oscillator 13 once again to provide periodic output signals to counter 30, for a duration of time that may once again be compared with the output signal from reference oscillator 15.

When radiation strikes radiation sensitive cell 12 while radiation sensor device 10 is unpowered, and the resistance of radiation sensitive cell 12 is altered, the oscillation frequency inherent to radiation sensitive oscillator 13 is also altered, as will be detected when radiation sensor device 10 is powered up again. In particular, when radiation sensor device 10 is powered up again, controller 62 may take a new reading of the oscillation frequency of radiation sensitive oscillator 13 to see whether the oscillation frequency has changed since a previous reading or since the initial reading. Since radiation sensitive cell 12 has been struck by radiation during the interim in which radiation sensor device 10 was unpowered, counter 30 may receive the output signals from radiation sensitive oscillator 13 at a new, altered oscillation frequency, i.e., an oscillation frequency that has changed from the initial oscillation frequency to a new, altered oscillation frequency due to the radiation-induced change in resistance of radiation sensitive cell 12. Counter 30 then counts occurrences of the output signal from radiation sensitive oscillator 13 at the new oscillation frequency.

Controller 62 may read the count from counter 30, representing the number of times counter 30 has received the output signal from radiation sensitive oscillator 13 in a specified duration of time defined by a specified number of output signals from reference oscillator 15. With radiation sensitive oscillator 13 on its new oscillation frequency, the count that radiation sensitive oscillator 13 delivers via counter 30 within this specified period of time is correspondingly different from its count in the same period of time at its initial oscillation frequency. That initial count from radiation sensitive oscillator 13 at its initial oscillation frequency may be considered an expectation value consistent with an absence of incident radiation. A count different from the expectation value indicates that radiation sensitive oscillator 13 did intercept incident radiation in the interim. In this manner, radiation sensor device 10 indicates that radiation sensor device 10 had been exposed to radiation during the period of time in which it was unpowered.

The comparison of a current count from radiation sensitive oscillator 13 with its expectation value may also indicate how much radiation has struck radiation sensor device 10 during an interim. Radiation sensitive cell 12 may alter its resistance based on how much radiation it intercepts, in a precisely known relation, at least over a certain range of total radiation incidence. This may also configure radiation sensor device 10 to indicate how much radiation it has intercepted, by how much the oscillation frequency of radiation sensitive oscillator 13 has altered, at least over a given range of incident radiation and corresponding range of variation in the oscillation frequency of radiation sensitive oscillator 13.

While the example above indicates a way in which radiation sensor device 10 may track whether and how much radiation it has intercepted during a period of time in which radiation sensor device 10 is unpowered, radiation sensor device 10 may similarly track its exposure to radiation during periods when it is powered, or when it may be unpowered at one or more times and powered at one or more times. Radiation sensor device 10 may track its exposure to incident radiation regardless of whether it is powered or not.

Counters 30 and 30R may each have a limit to how high of a cumulative count they may count up to, defined by their internal memory capacity. Controller 62 may be configured to activate radiation sensitive oscillator 13 and reference oscillator 15 for periods of time that are within the capacities of counters 30 and 30R temporarily to store instances of a count, for example. Controller 62 may also be configured to read and record partial sums of a count by one of counters 30 and 30R to enable either of counters 30 and 30R to continue counting beyond their internal memory capacity, without losing any information from their counts, for example.

Controller 62 may effectively send a command to both radiation sensitive oscillator 13 and reference oscillator 15 to begin a new reading of their oscillation frequencies by setting output terminal 69 to the threshold voltage, thereby communicating the threshold voltage to the second comparator input terminals 22 and 22R of radiation sensitive oscillator 13 and reference oscillator 15 respectively. When controller 62 is not taking a measurement of the oscillation frequency of radiation sensitive oscillator 13, controller 62 may set output terminal 69 and second comparator input terminals 22 and 22R to a stop voltage that the voltage on cell output terminal 20 and resistor output terminal 20R can never reach, so that they never trigger an output signal from comparators 24 and 24R. In this setting, radiation sensitive oscillator 13 and reference oscillator 15 are both kept in a static state and do not oscillate. This static state may conserve power relative to when radiation sensitive oscillator 13 and reference oscillator 15 are oscillating, which consumes power through source voltage terminals 18 and 18R to drive the oscillations. Controller 62 may also reset counters 30 and 30R via reset terminal 64, and potentially send start and stop commands to counters 30 and 30R via terminal 63, prior to taking a new reading of the oscillation frequency of radiation sensitive oscillator 13.

Radiation sensor device 10 may be incorporated as part of an integrated circuit or other device in which controller 62 reads the count from radiation sensitive oscillator 13 via counter 30 and counter output 38 to determine whether radiation sensor device 10 has been exposed to radiation. Controller 62 may then perform or cause other components to perform one or more selected actions in response to a positive indication that radiation sensor device 10 has been exposed to radiation. For example, controller 62 may send a command to memory component 72 and/or other memory components or data storage components to refresh a flash memory. Controller 62 may also respond to a change in the count from radiation sensitive oscillator 13 by signaling other elements outside of an integrated circuit that incorporates radiation sensor device 10. For instance, such a circuit could be used to initiate a data refresh for flash memory elements in a space environment which may be sensitive to loss of information if exposed to a sufficient amount of radiation. Controller 62 may also respond to a change in the count from radiation sensitive oscillator 13 by providing a signal to other components or devices indicating whether or not an integrated circuit that incorporates radiation sensor device 10 has been exposed to more than a selected dose of radiation. This may include causing other elements of the integrated circuit to provide a signal from the integrated circuit to other elements of a communication system, computing system, and/or other electronic system, to communicate the information of how much of the selected type or frequency range of radiation to which radiation sensor device 10 has been exposed.

Radiation sensitive cell 12 may be struck by relatively smaller doses of incident radiation with significant intervals of time in between receiving any radiation, but still persistently retain the changes to its resistance in between doses over significant durations of time, in various examples. Radiation sensitive cell 12 may therefore still accurately track exposures to incident radiation over time. In various other examples, the resistance of radiation sensitive cell 12 may also vary over relatively long periods of time due to other effects independent of incident radiation, such as random electron tunneling or other electron leakage. In such a case, radiation sensor device 10 may potentially include additional circuitry or other means for compensating for or correcting for this additional rate of change in the resistance of radiation sensitive cell 12 over time.

As one example, radiation sensitive cell 12 may have a known rate of decrease of its resistance by 1% per year due to random electron tunneling, independent of any exposure to radiation. Radiation sensor device 10 may correct for this, such as by causing a small variation in the threshold voltage on the second input terminal 22 over time to produce an equivalent response profile from the comparator 24 as if radiation sensitive cell 12 had no non-radiation-dependent variation in resistance. In another example, controller 62 may simply account for this known variation over time in logic, whether implemented in hardware and/or software, as a correction factor when it compares the count from radiation sensitive oscillator 13 via counter 30 with a recorded initial value or prior value of a count from radiation sensitive oscillator 13 over the same period of time. Other examples may experience other rates of electron leakage higher or lower than the specific example mentioned above, or other secondary effects. In other examples, radiation sensitive cell 12 may experience no electron tunneling or other effects that induce any changes in the resistance it applies other than exposure to incident radiation of the selected type or range.

Controller 62 also has a connection 64 to reset inputs of counters 30 and 30R, and may thereby be configured to reset the counts maintained by counters 30 and 30R, such as to 0. This may be a desirable option once the oscillation frequency of radiation sensitive oscillator 13 has been measured, such that controller 62 prepares the counters 30 and 30R to make another measurement of the oscillation frequency of radiation sensitive oscillator 13 at some point in the future. Controller 62 also has system input connections 66 and system output connections 68 on which it may receive and send data to the rest of an integrated circuit that incorporates radiation sensor device 10, or to other components or devices. For example, controller 62 may send a memory refresh command to the rest of the integrated circuit, or to a larger system, via system output connections 68, in response to a newly measured instance of the oscillation frequency of radiation sensitive oscillator 13 being different from the recorded initial oscillation frequency by at least a selected threshold difference, if any non-zero threshold is selected.

Figure 2:
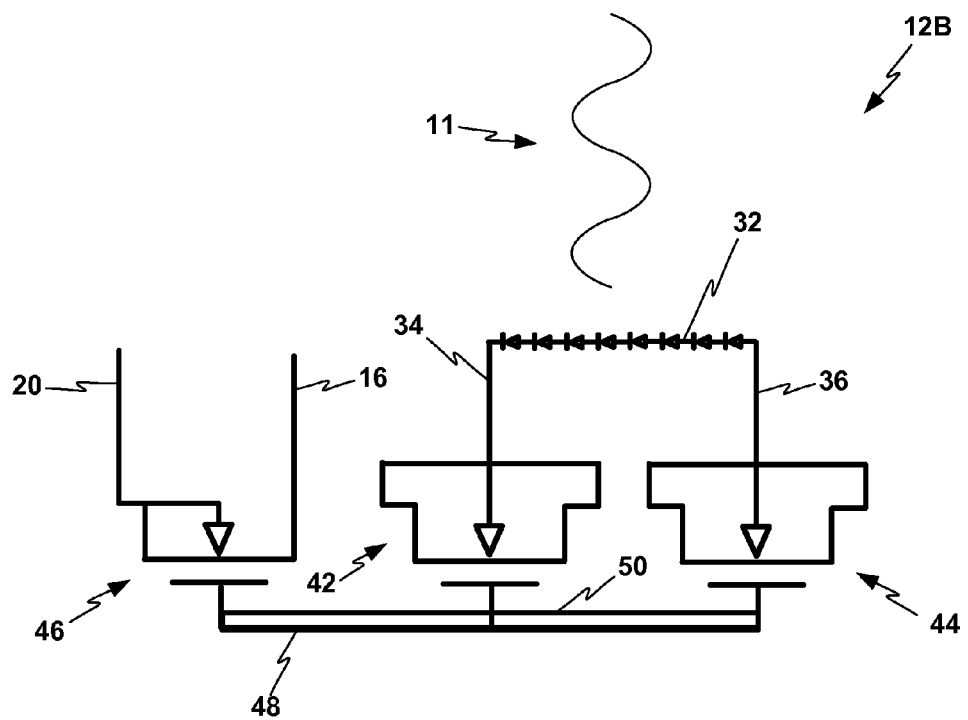
FIG. 2 is a circuit diagram of an illustrative example of a radiation sensitive cell that may be part of a radiation sensitive circuit device of this disclosure.

FIG. 2 is a circuit diagram of an illustrative example of a radiation sensitive cell 12B that may be part of a radiation sensor device of this disclosure, such as radiation sensor device 10 of FIG. 1. Radiation sensitive cell 12B may include or be a single-polysilicon Electrically Erasable Programmable Read Only Memory (EEPROM) cell formed as part of a CMOS integrated circuit. In this example, radiation sensitive cell 12B includes a floating gate 48, charging terminals 34 and 36, a ground terminal 16, and a cell output terminal 20. Radiation sensitive cell 12B may also include a metal oxide semiconductor (MOS) tunneling capacitor 42, a MOS control capacitor 44, and a floating gate transistor 46 that includes a MOS floating gate capacitor.

Floating gate transistor 46 includes a metal oxide semiconductor field effect transistor (MOSFET), illustratively depicted as an N-channel MOSFET transistor in this example, and which may be implemented with a P-channel MOSFET transistor in other examples. Floating gate transistor 46 has a "floating gate" because its only electrical connection is through electron tunneling. Radiation sensitive cell 12B may be formed using a polysilicon deposition process to form a single polysilicon layer for the control capacitor 44, the tunneling capacitor 42, and the floating gate transistor 46. Ground terminal 16 and cell output terminal 20 are connected to the MOSFET transistor of floating gate transistor 46.

Charging terminals 34 and 36 may be connected between photodiode bank 32, control capacitor 44, and tunneling capacitor 42. Photodiode bank 32 includes a set of photodiodes connected together in series. While a given number of photodiodes are illustrated in the example circuit diagram of FIG. 2, various example photodiode banks may include any number of one or more photodiodes.

Photodiode bank 32 forms a cell charging circuit that charges the tunneling capacitor 42 and the control capacitor 44 when photodiode bank 32 intercepts qualifying radiation 11, i.e., radiation of a type that photodiode bank 32 is configured to be sensitive to. Each photodiode in photodiode bank 32 translates a photon incident on the photodiode into a temporary voltage that temporarily induces an electrical current across the photodiode. With multiple photodiodes connected in series, this voltage response to incoming radiation incident on the individual photodiodes may be superposed together such that each photodiode that receives incident radiation contributes additional voltage to the overall voltage of the photodiode bank 32.

When photodiode bank 32 intercepts radiation 11, it may charge the tunneling capacitor 42 and the control capacitor 44 proportionally to the amount or flux of radiation 11 it receives, or in some other relation based on the amount or flux of radiation 11 it receives. The charging of tunneling capacitor 42 and control capacitor 44 based on how much radiation 11 photodiode bank 32 receives may be based on both the intensity of radiation 11 at a given time, and the duration of time for which radiation 11 strikes photodiode bank 32.

For example, the charging of tunneling capacitor 42 and control capacitor 44 may be based on an integral of total flux of radiation 11 incident on photodiode bank 32 over time, although this may also be modified by additional factors such as differential response by photodiode bank 32 to radiation 11 at the peripheries of the range of sensitivity of photodiode bank 32 to radiation 11, or non-linear effects in the response of photodiode bank 32 to radiation 11, particularly when radiation 11 has a relatively high intensity. Radiation sensitive cell 12B may be designed to mitigate or account for non-linear response factors of photodiode bank 32 to radiation 11, such as by including collimators or filters in the path of radiation 11 before it strikes photodiode bank 32, or including multiple photodiode banks with different response profiles and comparing the responses of different photodiode banks to isolate and resolve any non-linear responses, for example.

By charging tunneling capacitor 42 in response to radiation 11, photodiode bank 32 induces tunneling of charge carriers such as electrons from tunneling capacitor 42 through insulating layer 50 to floating gate 48. This delivery of charge carriers to floating gate 48 alters the resistance of floating gate transistor 46, i.e., it alters the resistance applied by floating gate transistor 46 between ground terminal 16 and cell output terminal 20. In this manner, radiation sensitive cell 12B is configured to alter or vary the resistance between the ground terminal 16 and the cell output terminal 20 in response to radiation 11 incident on the radiation sensitive cell 12B, and in particular, in response to radiation 11 incident on photodiode bank 32 of radiation sensitive cell 12B. Radiation sensitive cell 12B thereby alters or varies the voltage of the cell output terminal 20 in response to radiation 11 incident on radiation sensitive cell 12B.

Additionally, photodiode bank 32 is operable to charge tunneling capacitor 42 and control capacitor 44 and thereby to charge floating gate 48 and to alter or vary the resistance between the ground terminal 16 and the cell output terminal 20 in response to incident radiation 11 regardless of whether radiation sensitive cell 12B is powered or unpowered. Photodiode bank 32 is operable to generate a voltage between charging terminals 34 and 36 in response to radiation 11 regardless of whether radiation sensitive cell 12B is powered. The energy required for photodiode bank 32 to generate this voltage between charging terminals 34 and 36 is supplied by the incident radiation 11 itself The energy required for the tunneling of charge carriers from tunneling capacitor 42 to floating gate 48 is similarly supplied by the voltage on charging terminal 34 and thereby also by the incident radiation 11 itself.

Once the charge carriers have tunneled to floating gate 48, the charge carriers are electrically isolated on floating gate 48 and remain on floating gate 48 without requiring any further power. Floating gate 48 may continue to accumulate charge due to charging in response to any additional radiation 11, at least over a selected range of capacity for charge accumulation, without requiring any source of energy other than the incident radiation itself, and regardless of whether radiation sensitive cell 12B is powered or unpowered. In this manner, floating gate transistor 46 may continue to vary the resistance it applies between ground terminal 16 and cell output terminal 20 in response to radiation 11 incident on radiation sensitive cell 12B, regardless of whether radiation sensitive cell 12B is powered or unpowered.

During times when radiation sensitive cell 12B is unpowered, radiation sensitive cell 12B alters or varies the resistance of floating gate transistor 46 in response to incident radiation 11 without varying the voltage of the cell output terminal 20, since the voltage of the cell output terminal 20 is also dependent on the voltage difference between source voltage terminal 18 and ground voltage terminal 16, which is dependent on radiation sensitive cell 12B being powered. Since radiation sensitive cell 12B varies the resistance of floating gate transistor 46 in response to incident radiation 11 regardless of whether radiation sensitive cell 12B, though, even when radiation sensitive cell 12B is unpowered, radiation sensitive cell 12B alters the voltage that cell output terminal 20 is going to have after radiation sensitive cell 12B is powered up again. In other words, radiation sensitive cell 12B effectively stores a latent but inherent value for the voltage that it will apply to cell output terminal 20 once radiation sensitive cell 12B is powered up again, in the form of the resistance of floating gate transistor 46. Even when radiation sensitive cell 12B is unpowered, radiation sensitive cell 12B continues to respond to any incident radiation by altering that latent but inherent stored value for the voltage that it will apply to cell output terminal 20 in the form of the resistance of floating gate transistor 46.

Radiation sensitive cell 12B thereby alters the voltage of the cell output terminal 20 in response to radiation 11 incident on radiation sensitive cell 12B, either in a rapid real-time process if radiation sensitive cell 12B and in particular cell output terminal 20 is powered at the time of the incident radiation, or in a delayed process if radiation sensitive cell 12B is unpowered at the time of the incident radiation. In the delayed process in the case of radiation sensitive cell 12B being unpowered at the time of the incident radiation, the altered voltage to be applied to the cell output terminal 20 in response to radiation 11 incident on radiation sensitive cell 12B is latently but inherently stored via the resistance of floating gate transistor 46, and then applied to the cell output terminal 20 after radiation sensitive cell 12B is powered up again.

The overall voltage response of the photodiode bank 32 may be designed by selecting different numbers of photodiodes to connect in series, in different examples of radiation sensitive cell 12B. Different examples of radiation sensitive cell 12B may also be designed with different types of photodiodes that have different frequency ranges of radiation in response to which the photodiodes generate a voltage. A designing engineer may also further tailor a desired radiation response profile for photodiode bank 32 by positioning one or more shields, filters, coatings, grids, gratings, or collimators over photodiode bank 32, or by using multiple photodiode banks with different response profiles and comparing their results, or any combination of the above, in different examples. Different options for tailoring specific response profiles for the photodiode bank 32 are further detailed below.

As one particular example, a selected photodiode may have a response range of up to a maximum of approximately 0.6 volts generated in response to a certain flux of qualifying radiation, where "qualifying radiation" is used herein to indicate a type of radiation that induces a voltage response in a given photodiode, or other type of radiation sensitive element of a radiation sensitive cell. In other words, "qualifying radiation" is used herein to indicate a type of radiation to which a radiation sensitive element of a radiation sensitive cell is sensitive and responsive.

In this example where each photodiode has a maximum response of 0.6 volts it generates in response to a given upper threshold of flux of radiation for its range of response, stacking two such photodiodes in series may superpose the maximum voltage response of the photodiodes, so that together they have a maximum response of 1.2 volts. If the same flux of radiation strikes the area of both of these photodiodes, assuming the same flux density over the area, the same radiation exposure event will generate twice the voltage response. A photodiode bank 32 may include two of these photodiodes for a maximum voltage response of 1.2 volts, or may include ten photodiodes for a maximum voltage response of approximately 6.0 volts, or twenty photodiodes for a maximum voltage response of approximately 12.0 volts, in various examples.

The number of photodiodes selected in designing a particular photodiode bank 32 may take into account for other properties of radiation sensitive cell 12B, such as the thickness of insulating layer 50 and the charge-carrying capacity of floating gate 48. The thickness of insulating layer 50 may be partly a function of the manufacturing process used to make radiation sensitive cell 12B, which may be a standard CMOS single-polysilicon process, for example. Generally, the thicker the insulating layer 50, the higher the voltage may be required to tunnel charge carriers from tunneling capacitor 42 through insulating layer 50 to floating gate 48.

Insulating layer 50 may be formed as a silicon oxide layer by oxidation of a surface of a single polysilicon layer, and the thickness of the silicon oxide layer may be controlled by varying the duration of time or other properties of the process of oxidizing the surface of the single polysilicon layer, in this example. The charge carrying capacity of floating gate 48 may also be constrained in part by the thickness of insulating layer 50, where the higher the thickness of insulating layer 50, the more charge that floating gate 48 may accumulate before its charge storing response becomes non-linear or reaches a maximum due to its own stored charge beginning to enable charge carrier tunneling back through insulating layer 50, for example.

Therefore, increasing the number of photodiodes included in photodiode bank 32 may also increase the thickness of insulating layer 50 and the charge carrying capacity of floating gate 48 that may be used, and therefore also increase the total response range and general performance of radiation sensitive cell 12B, at least within a given range for the potential number of photodiodes. The advantages of a higher number of photodiodes may also be constrained at an upper end by reasonable system voltage levels in radiation sensitive cell 12B, depending on implementation specifics, where different materials, dimensions, or processes being suitable for different upper bounds on voltage.

In various examples, photodiode bank 32 may be manufactured with a silicon-on-insulator (SOI) CMOS process in which each diode is fully isolated by insulator material, which may be an oxide. This may provide advantages such as eliminating parasitic photosensitive elements that may occur in other bulk CMOS processes, for example.

In one particular illustrative example, a designing engineer may opt to form the insulating layer 50 with a high-voltage oxide and a thickness of 60 angstroms. In this case, the photodiode bank may need to have a maximum voltage response of approximately five volts to induce charge carrier tunneling through the insulating layer 50 with a suitable sensitivity to incident radiation 11 on photodiode bank 32, i.e., to have a suitably high rate of charging floating gate 48 in response to incident radiation 11. Since each photodiode in this example contributes approximately 0.6 volts at its maximum response to incident radiation, the designing engineer may opt to include eight or nine photodiodes in photodiode bank 32 to generate a maximum response voltage of approximately five volts at an upper range of flux of the qualifying radiation.

Using different numbers of photodiodes in photodiode bank 32 may cause a different maximum voltage provided to tunneling capacitor 42 and a different rate of charge carrier tunneling through insulating layer 50 in response to the same flux of incident radiation 11. An engineer designing a particular embodiment of radiation sensitive cell 12B may desire a relatively higher voltage and higher response rate in some applications. In different examples, the engineer may conclude that her desired maximum response voltage is ten volts, or twenty volts, for photodiode bank 32. One of these higher response voltage levels may be best suited to generate a stored charge on floating gate 48 quickly and accurately in response to a relatively short yet intense flux of radiation 11, in various applications.

The advantages of more photodiodes and higher voltage for photodiode bank 32 in response time and precision response to short and high intensity radiation flux may also be constrained at an upper range by the materials, dimensions, and processes used in a specific implementation of radiation sensitive cell 12B. Designing a photodiode bank 32 to provide a higher voltage than approximately twenty volts, in some examples, may push up against the physical limits of the materials that form radiation sensitive cell 12B, which may for example take the form of risking a dielectric breakdown in insulating layer 50 at the upper end of the voltage response of photodiode bank 32. Various materials, dimensions, and processes may impose different upper limits on the voltage used for radiation sensitive cell 12B, and different criteria for optimizing the desired maximum response voltage between desired response time, desired precision, and the constraints of available materials, dimensions, and processes used for radiation sensitive cell 12B. An engineer may perform optimization analysis to decide on a specific design to implement radiation sensitive cell 12B in a given application.

In the example in which each photodiode stacked in series contributes a maximum response voltage of approximately 0.6 volts, the engineer may then opt to include sixteen or seventeen photodiodes in photodiode bank 32 to configure photodiode bank 32 for a maximum response threshold of approximately ten volts, or the engineer may opt to include thirty-three or thirty-four photodiodes in photodiode bank 32 to configure photodiode bank 32 for a maximum response threshold of approximately twenty volts. In these examples, these specific numbers of photodiodes to include in photodiode bank 32 may advantageously configure radiation sensitive cell 12B for rapid and precise performance, in terms of rapidly inducing a charge on floating gate 48 that responds with high precision to even a relatively short and intense emission of incident radiation 11, and within the physical limits of radiation sensitive cell 12B without risking negative effects at the upper range of voltage response, such as an imprecise non-linear response or dielectric breakdown.

Radiation sensitive cell 12B may have an initial resistance on floating gate transistor 46 at the time of manufacture or at some time thereafter and before deployment. For example, radiation sensitive cell 12B may be manufactured in a number of manufacturing steps, and at or near the end of the manufacturing process, the resistance of radiation sensitive cell 12B may be tested and recorded. The initial resistance may be due in part simply to the structure of floating gate transistor 46, or to a relatively minor charge induced on floating gate 48 by photodiode bank 32 during incidental exposure to radiation such as visible light during the manufacturing process, or to a relatively minor charge on floating gate 48 inherent to its electrostatic response to the structure of the components in its vicinity in radiation sensitive cell 12B or in a larger integrated circuit or other device in which it is incorporated, for example.

The initial resistance of radiation sensitive cell 12B may be measured and recorded at or near the end of the manufacturing process, for comparison to later measurements. This may take the form of measuring and recording the oscillation frequency of a radiation sensitive oscillator incorporating radiation sensitive cell 12B, such as oscillator 13 in radiation sensor device 10 of FIG. 1, in which radiation sensitive cell 12B may be incorporated as its radiation sensitive cell 12 as shown in FIG. 1. This may also include measuring and recording the oscillation frequencies of both the radiation sensitive oscillator 13 and the reference oscillator 15 at the same time, and storing data on the results in reference count entry 73 in memory component 72, as described above with reference to FIG. 1.

Since floating gate transistor 46 is implemented as an N-channel MOSFET transistor in the example of FIG. 2, floating gate transistor 46 may initially have a low or zero charge on floating gate 48 and may apply a high initial resistance between ground terminal 16 and cell output terminal 20. Radiation sensitive cell 12B may then respond to any subsequent incident radiation of a qualifying type on the series-connected photodiodes of photodiode bank 32 by decreasing the resistance between the ground terminal 16 and the cell output terminal 20 from the high initial resistance, as previously measured and recorded, to a new, lower resistance, due to the charging of floating gate 48. That new, lower resistance is then available to be measured and compared to the initial resistance of radiation sensitive cell 12B, such as by measuring the resulting new oscillation frequency of a radiation sensitive oscillator 13 incorporating radiation sensitive cell 12B, and comparing it to the recorded initial oscillation frequency of the same radiation sensitive oscillator 13, for example.

Referring again to an implementation of radiation sensor device 10 of FIG. 1 that incorporates radiation sensitive cell 12B of FIG. 2, when controller 62 takes an initial measurement of the oscillation frequency of radiation sensitive oscillator 13, the floating gate 48 is at its initial low or zero charge and the resistance that floating gate transistor 46 applies between ground terminal 16 and cell output terminal 20 is high. In this case, the oscillation frequency of radiation sensitive oscillator 13 is also relatively low. This is because, with floating gate transistor 46 applying a high resistance between ground terminal 16 and cell output terminal 20, cell output terminal 20 provides an initially high-resistance path between source voltage terminal 18 and ground terminal 16, so that cell output terminal 20 and capacitor 14 take a relatively long time to dissipate voltage to ground terminal 16 after triggering comparator 24.

If photodiode bank 32 of radiation sensitive cell 12B subsequently intercepts a significant dose of qualifying radiation, this charges floating gate 48, which decreases the resistance that floating gate transistor 46 applies between ground terminal 16 and cell output terminal 20. If controller 62 then takes another reading of the oscillation frequency of radiation sensitive oscillator 13, it will detect that the oscillation frequency of radiation sensitive oscillator 13 has increased. The mechanism for this increase in frequency is that since floating gate transistor 46 now applies a lower resistance between ground terminal 16 and cell output terminal 20, once the P-channel MOSFET transistor 19 turns off the connection with voltage terminal 18, the voltage on cell output terminal 20 and capacitor 14 dissipates or decays more rapidly through radiation sensitive cell 12B to ground terminal 16. This translates to cell output terminal 20 decreasing in voltage more quickly and triggering a signal from comparator 24 more quickly on each cycle, thereby delivering output signals to counter 30 at an increased rate. Radiation sensitive oscillator 13 thereby now has a higher oscillation frequency due to qualifying incident radiation having intercepted photodiode bank 32 of radiation sensitive cell 12B at some intervening point in time between the earlier and later readings.

Other examples may be implemented with a P-channel MOSFET for floating gate transistor 46, so that the initial resistance floating gate transistor 46 applies between ground terminal 16 and cell output terminal 20 when floating gate 48 is uncharged is relatively low, and then increases in response to the charging of floating gate 48 in response to incident radiation on photodiode 32. This example may simply reverse the relation between charging of floating gate 48 and the resistance that floating gate transistor 46 between ground terminal 16 and cell output terminal 20 relative to the N-channel MOSFET implementation described above. In this P-channel MOSFET implementation, radiation sensitive oscillator 13 thereby decreases its oscillation frequency in response to incident radiation on photodiode 32 of radiation sensitive cell 12B. Controller 62 may be implemented in this example to equate a decreased oscillation frequency as an indication that radiation sensitive oscillator 13 has intercepted qualifying incident radiation. Different implementations of a radiation sensitive oscillator 13 may thereby be used that in general alter their oscillation frequency, either higher or lower, after being exposed to radiation.

Figure 3:
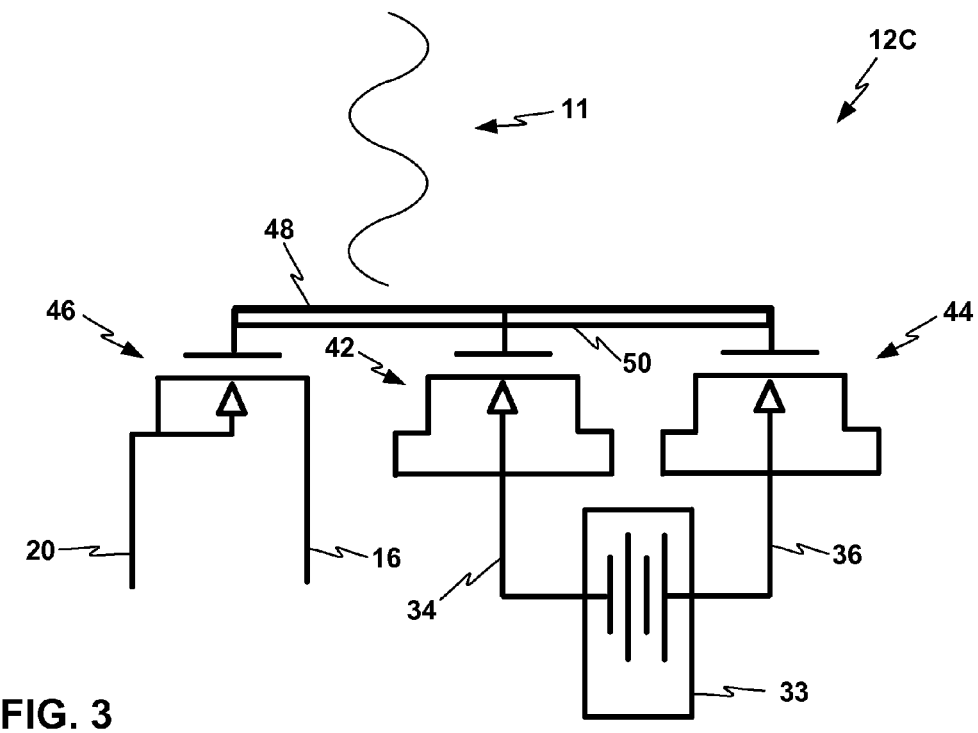
FIG. 3 is a circuit diagram of an illustrative example of a radiation sensitive cell that may be part of a radiation sensitive circuit device of this disclosure.

FIG. 3 is a circuit diagram of an illustrative example of another type of radiation sensitive cell 12C that may be part of a radiation sensor device of this disclosure, such as radiation sensor device 10 of FIG. 1. Radiation sensitive cell 12C has some similarities with and some differences from radiation sensitive cell 12B of FIG. 2. As with radiation sensitive cell 12B of FIG. 2, radiation sensitive cell 12C may include or be a single-polysilicon Electrically Erasable Programmable Read Only Memory (EEPROM) cell formed as part of a CMOS integrated circuit. In this example, radiation sensitive cell 12C includes a floating gate 48, charging terminals 34 and 36, a ground terminal 16, and a cell output terminal 20. Radiation sensitive cell 12C may also include a metal oxide semiconductor (MOS) tunneling capacitor 42, a MOS control capacitor 44, and a MOS floating gate transistor 46.

Floating gate transistor 46 includes a metal oxide semiconductor field effect transistor (MOSFET), illustratively depicted as an N-channel transistor in this example, and which may also be implemented as a P-channel transistor in other examples. Radiation sensitive cell 12C may be formed using a polysilicon deposition process to form a single polysilicon layer for the control capacitor 44, the tunneling capacitor 42, and the floating gate transistor 46. Ground terminal 16 and cell output terminal 20 are connected to the MOSFET transistor of floating gate transistor 46.

Radiation sensitive cell 12C also includes a cell charging circuit 33. One way in which radiation sensitive cell 12C differs from radiation sensitive cell 12B of FIG. 2 is that radiation sensitive cell 12C in the example of FIG. 3 does not include a photodiode bank. In radiation sensitive cell 12C, charging terminals 34 and 36 are connected between cell charging circuit 33, control capacitor 44, and tunneling capacitor 42. Cell charging circuit 33 is configured to deliver voltage across charging terminals 34 and 36 based on a source voltage, which may be the same source voltage to which voltage source terminal 18 is connected in radiation sensor device 10 of FIG. 1, for example.

Cell charging circuit 33 thereby configures charging terminal 34 to deliver charge from cell charging circuit 33 to tunneling capacitor 42, and configures charging terminal 36 to deliver charge from cell charging circuit 33 to control capacitor 44. Cell charging circuit 33 may thereby charge up tunneling capacitor 42 and control capacitor 44, and thereby cause electrons to tunnel from a conduction band of tunneling capacitor 42, through insulating layer 50, such as an oxide layer, into floating gate 48. Once cell charging circuit 33 charges tunneling capacitor 42 and control capacitor 44 to a certain level, it causes a certain level of charge to be deposited on floating gate 48 in the form of the electrons tunneled to floating gate 48 from tunneling capacitor 42.

The electrons remain on floating gate 48 after cell charging circuit 33 no longer provides a charge to tunneling capacitor 42. The charge on floating gate 48 also controls the state of floating gate transistor 46, in particular, by setting floating gate transistor 46 to a relatively high resistance, in this example. This resistance may be an initial resistance to which radiation sensitive cell 12C is initially set. Floating gate 48 may thereby be configured to be charged via tunneling capacitor 42, and radiation sensitive cell 12C may be set to the initial resistance when floating gate 48 is charged to the initial charge.

While the examples above for FIGS. 2 and 3 are discussed at times in terms of electrons being tunneled to floating gate 48, other examples may refer to charge carriers in general, so that cell charging circuit 33 may charge tunneling capacitor 42 with either a negative or positive charge, and tunneling capacitor 42 may donate electrons to tunnel to floating gate 48.

Floating gate 48 may be configured such that the electrons (in this example) on floating gate 48 may be susceptible to be discharged by one or more forms of radiation 11 incident on floating gate 48. This selection of the particular portion of a radiation sensitive cell to use as its radiation sensitive area is an area of difference between the examples of FIGS. 2 and 3. In the example of FIG. 2, photodiode bank 32 is exposed to potential incident radiation and forms the radiation sensitive area of radiation sensitive cell 12B while floating gate 48 may be shielded or protected from incident radiation, and is configured to accumulate charge in response to incident radiation on photodiode bank 32; while in FIG. 3, floating gate 48 itself is exposed to potential incident radiation 11 and forms the radiation sensitive area of radiation sensitive cell 12C, and is configured to be discharged from an initial charge in response to incident radiation directly on floating gate 48 itself As in the discussion above with reference to FIG. 2, the description of FIG. 3 refers at times to incident radiation 11 with the understanding that this refers to a particular type of radiation to which radiation sensitive cell 12C is sensitive, and that qualifies for stimulating a response in radiation sensitive cell 12C. For the description of incident radiation 11 discharging electrons from floating gate 48, this refers to incident radiation 11 of a specific type or energy range to which radiation sensitive cell 12C is configured to respond.

When incident radiation 11 strikes floating gate 48, it may discharge electrons on floating gate 48, which may then propagate to the conduction band of tunneling capacitor 42. Floating gate 48 may be configured such that incident radiation 11 discharges electrons from floating gate 48 at a precisely understood and calculable rate, probability, or relation. Floating gate 48 may be configured such that each quantum of incident radiation 11 of sufficient energy discharges one electron from floating gate 48, or has some other precisely defined probability of discharging one electron from floating gate 48.

As additional radiation 11 strikes floating gate 48 over time, additional electrons discharge from floating gate 48. The probability for a given quantum of incident radiation 11 to dislodge an electron from floating gate 48 may vary over time, such as by decreasing as the charge density on floating gate 48 decreases, for example. This variation in the relation between the cumulative amount of incident radiation 11 over time and the remaining charge on floating gate 48 may be taken into account in the configuration of radiation sensitive cell 12C or of a radiation sensor device of which radiation sensitive cell 12C forms a part. In various examples, the amount of charge remaining on floating gate 48 may therefore be a precisely understood representation for the amount of incident radiation 11 that has struck floating gate 48 over time. Floating gate 48 may therefore be configured to be discharged in response to incident radiation 11, wherein radiation sensitive cell 12C varies in resistance as a function of floating gate 48 being discharged in response to the incident radiation 11.

Floating gate transistor 46 of radiation sensitive cell 12C may be configured to apply a resistance between the ground terminal 16 and the cell output terminal 20. In this particular example, once cell charging circuit 33 charges the radiation sensitive cell 12C, and in particular floating gate 48, to its initial, relatively high charge, floating gate transistor 46 may apply an initial gate voltage that is relatively high, causing an initial resistance to be relatively low between ground terminal 16 and cell output terminal 20.

Floating gate transistor 46 may then apply a resistance between ground terminal 16 and cell output terminal 20 that increases as the charge on floating gate 48 decreases from its initial charge, as floating gate 48 is struck by incident radiation 11. Radiation sensitive cell 12C may therefore be configured to apply a resistance between the ground terminal 16 and the cell output terminal 20 that is altered, and in particular is increased in this example, in response to radiation that is incident to the floating gate 48 and discharges the floating gate 48.

Various implementations of radiation sensor device 10 of FIG. 1 may use radiation sensitive cell 12B of FIG. 2 or radiation sensitive cell 12C of FIG. 3 as its radiation sensitive cell 12 as in FIG. 1. In these examples, as in the examples discussed above with reference to FIG. 1, the cell output terminal 20 may have a voltage that alters or varies in response to the altering or varying of the resistance applied by the radiation sensitive cell 12B as in FIG. 2 or the radiation sensitive cell 12C as in FIG. 3 between the ground terminal 16 and the cell output terminal 20. Radiation sensitive cell 12B or radiation sensitive cell 12C may therefore function as part of radiation sensor device 10 of FIG. 1 to alter the voltage of cell output terminal 20, thereby altering the period of time for the voltage of cell output terminal 20 to reach the threshold voltage on second input terminal 22, and thereby altering the oscillation rate of oscillator 13. Either radiation sensitive cell 12B of FIG. 2 or radiation sensitive cell 12C of FIG. 3 may therefore be used as the radiation sensitive cell 12 in radiation sensor device 10 of FIG. 1 to provide an easy-to-measure indication of incident radiation 11 that has struck radiation sensitive cell 12.

In various examples, radiation sensitive cell 12C of FIG. 3 may experience no electron tunneling or other effects that induce any changes in the resistance it applies other than incidence of radiation of the selected type or range. This may be ensured by providing the insulating layer 50, which may be implemented as an oxide layer, with a sufficient thickness to ensure that potential random, unprompted electron tunneling from floating gate 48 back to the conduction band of tunneling capacitor 42, i.e., electron tunneling in the absence of incident radiation, is prevented or kept to a negligible rate. Growing or depositing the oxide layer to a sufficient thickness for this purpose may be done within the scope of standard CMOS manufacturing processes and not require custom CMOS processes, in various examples.

While floating gate transistor 46 is implemented as an NMOS transistor in the example of FIG. 3, various examples may also use a PMOS transistor. In these examples, the radiation sensitive cell may also begin at a relatively low initial resistance, and the radiation sensitive cell resistance may increase cumulatively as a function of the radiation to which the floating gate 48 of radiation sensitive cell 12C is exposed.

Figure 4:
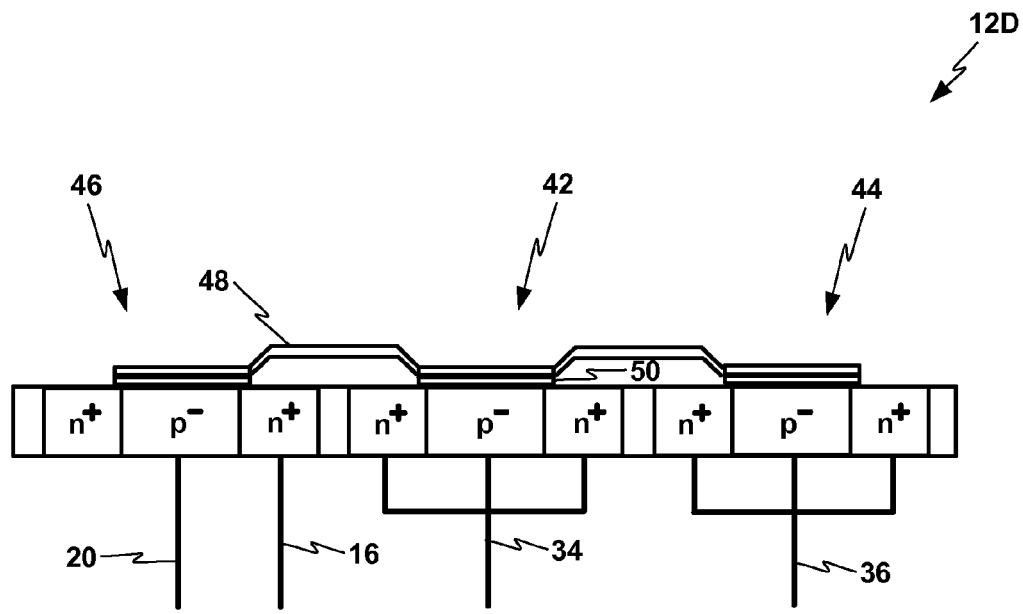
FIG. 4 is a schematic diagram of an illustrative example of a radiation sensitive cell that may be part of a radiation sensitive circuit device of this disclosure.

FIG. 4 is a schematic diagram of an illustrative example of a radiation sensitive cell 12D that may be part of a radiation sensor device of this disclosure, such as radiation sensor device 10 of FIG. 1. While FIG. 4 shows additional physical detail, radiation sensitive cell 12D of FIG. 4 may be an implementation of part of either radiation sensitive cell 12B of FIG. 2 or radiation sensitive cell 12C of FIG. 3, and all reference numbers in FIG. 4 in common with FIGS. 2 and 3 indicate the corresponding elements of the same reference numbers in FIGS. 2 and 3.

As shown in FIG. 4, floating gate transistor 46, tunneling capacitor 42, and control capacitor 44 may all be formed from a single-polysilicon EEPROM cell, each formed with a $p^-$ region surrounded by $n^+$ regions. Radiation sensitive cell 12D may be formed with a single polysilicon layer. Radiation sensitive cell 12D may therefore be formed with a standard CMOS process, and may be manufactured without requiring any custom CMOS processes in various examples. Other examples may be formed with additional polysilicon layers. Other examples may also include other arrangements of doped regions in the capacitors, including asymmetric capacitors, in which the tunneling capacitor 42 and the control capacitor 44 are formed with $n^+/p^-/p^+$ doped regions, for example. Other examples may also include multiple control capacitors and/or multiple tunneling capacitors, for example.

Multiple polysilicon processes may also be used to form a functionally similar floating gate structure which could also be used in circuit 10. Using a multiple polysilicon ("multiple poly") process may enable floating gate transistor 46, tunneling capacitor 42, and control capacitor 44 to be formed with a smaller size than when formed with a single poly process, though this may involve a trade-off with greater process complexity. In applications in which a multiple poly process is already being used in view of other system requirements, it may be advantageous to apply the multiple poly process for forming the floating gate transistor 46, tunneling capacitor 42, and control capacitor 44. For example, a multiple poly process may be used to create a large memory array or a large programmable logic array, which may already be susceptible to having their programming data erased if exposed to a large dose of radiation. In one of these examples, a radiation sensitive cell 12D may also be used to measure the amount of radiation and invoke a refresh of a flash memory containing the programming data with greater sensitivity than the inherent susceptibility of the memory array or programmable logic array to have their programming data erased by a large dose of radiation.

Figure 5:
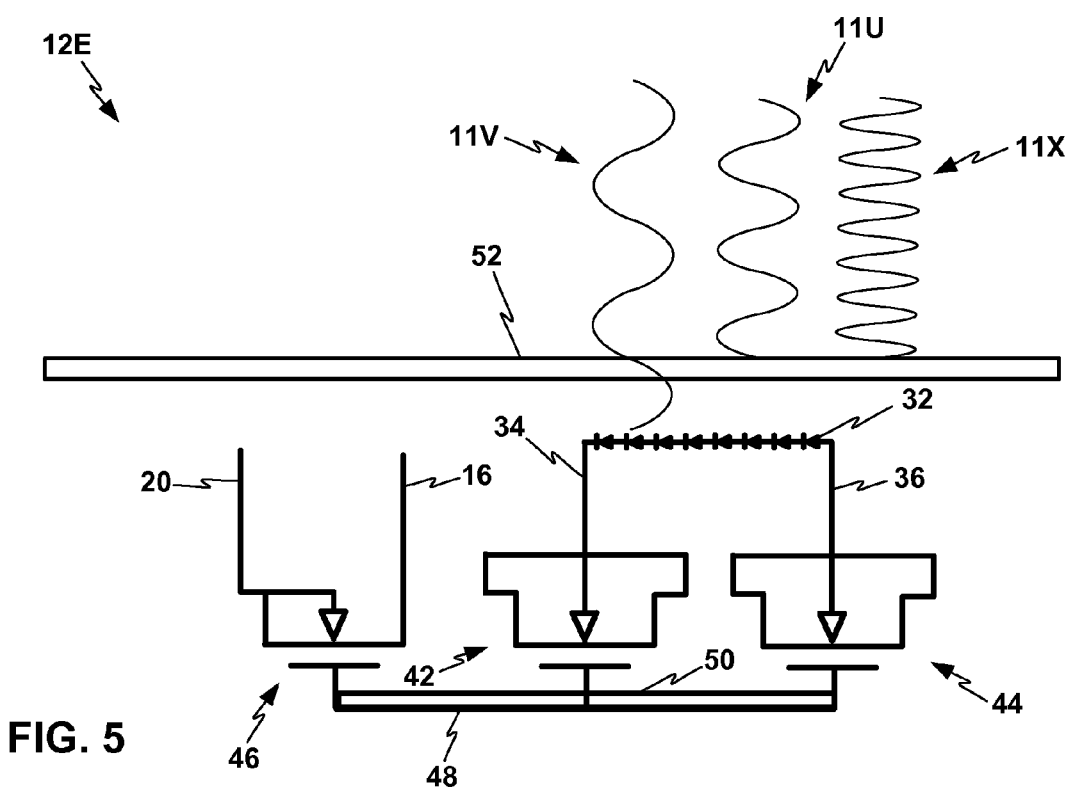
FIG. 5 is a circuit diagram of an illustrative example of a radiation sensitive cell that may be part of a radiation sensitive circuit of this disclosure.

FIG. 5 is a circuit diagram of an illustrative example of a radiation sensitive cell 12E that may be part of a radiation sensor device of this disclosure, such as radiation sensor device 10 of FIG. 1. Radiation sensitive cell 12E of FIG. 5 is similar to radiation sensitive cell 12B of FIG. 2, and with all corresponding reference numbers in common with FIG. 2. Radiation sensitive cell 12E of FIG. 4 differs in that it also includes a frequency-selective shield 52 positioned over photodiode bank 32. Frequency-selective shield 52 may be implemented as a filter, a reflective coating, a grid, any combination of the above, or any other implementation. Frequency-selective shield 52 is one way in which a radiation sensitive cell of this disclosure may be tailored to be sensitive and responsive only to certain kinds of radiation, and not sensitive to other kinds, so that the radiation sensitive cell provides a voltage response for charging a floating gate or otherwise varying an output voltage in response to selected or qualified types of radiation, and not to other types.

For example, radiation sensitive cell 12E may alternately be exposed to visible light radiation 11V, soft ultraviolet radiation 11U, and hard ultraviolet radiation 11X, at various times or at the same time. As shown in the example of FIG. 5, the particular frequency-selective shield 52 used in radiation sensitive cell 12E is opaque to soft ultraviolet radiation 11U (e.g., UVA) and hard ultraviolet radiation 11X (e.g., UVC for germicidal use), but is transparent to visible light radiation 11V. This particular configuration of radiation sensitive cell 12E may be included in a radiation sensor device for which ultraviolet light and X-rays are not of concern, but exposure to visible light is of concern, and it is desired to track any exposure of the radiation sensor device to visible light, and to prevent any soft ultraviolet radiation or hard ultraviolet radiation from interfering with the tracking of any incident visible light. It may also be desired to track infrared light, and frequency-selective shield 52 may be configured to be transparent to both infrared radiation and visible light but opaque to soft ultraviolet radiation and hard ultraviolet radiation, for example.

Referring to an embodiment of radiation sensor device 10 of FIG. 1 that includes radiation sensitive cell 12E as its radiation sensitive cell 12, once an integrated circuit that include radiation sensor device 10 is powered up, radiation sensitive oscillator 13 starts delivering its output signal to counter 30 at an altered oscillation frequency due to the altered resistance of radiation sensitive cell 12E. Counter 30 may communicate the altered oscillation frequency to a controller 62 of the integrated circuit.

Controller 62 may compare the newly communicated oscillation frequency with the reference oscillation frequency recorded in reference count store 73 in memory component 72 and detect that the current oscillation frequency is different from the recorded oscillation frequency, potentially by more than at least a selected threshold. The controller 62 may then react to this result by performing actions defined by the designer.

Frequency-selective shield 52 may therefore prevent radiation incident on radiation sensitive cell 12E that is outside a frequency range of interest from intercepting photodiode bank 32 or having a chance to affect the charge carriers on photodiode bank 32. In other examples, photodiode bank 32 may be implemented with photodiodes that are inherently only responsive to a frequency range of interest, or a frequency-selective shield 52 may be used together with photodiodes selected for particular frequency ranges of responsiveness to tailor the radiation sensitive cell 12E to the precise frequency ranges of interest.

In other examples, a variety of other means may be used for ensuring that photodiode bank 32 is only selectively exposed to incident radiation having frequencies or energy levels of interest, while photodiode bank 32 remains unaffected by other radiation. While the particular example of FIG. 4 depicts a frequency-selective shield 52 that is configured to block soft ultraviolet radiation or hard ultraviolet radiation but admit visible light, other examples may use means to admit or block or be sensitive or insensitive to any one or more portions of the electromagnetic spectrum and/or other forms of radiation, such as cosmic rays. In various examples, therefore, the resistance applied by radiation sensitive cell 12E between the ground terminal 16 and the cell output terminal 20 varies in response to radiation of a first frequency range incident to photodiode bank 32, while radiation of a second frequency range does not induce a response in photodiode bank 32.

Figure 6:
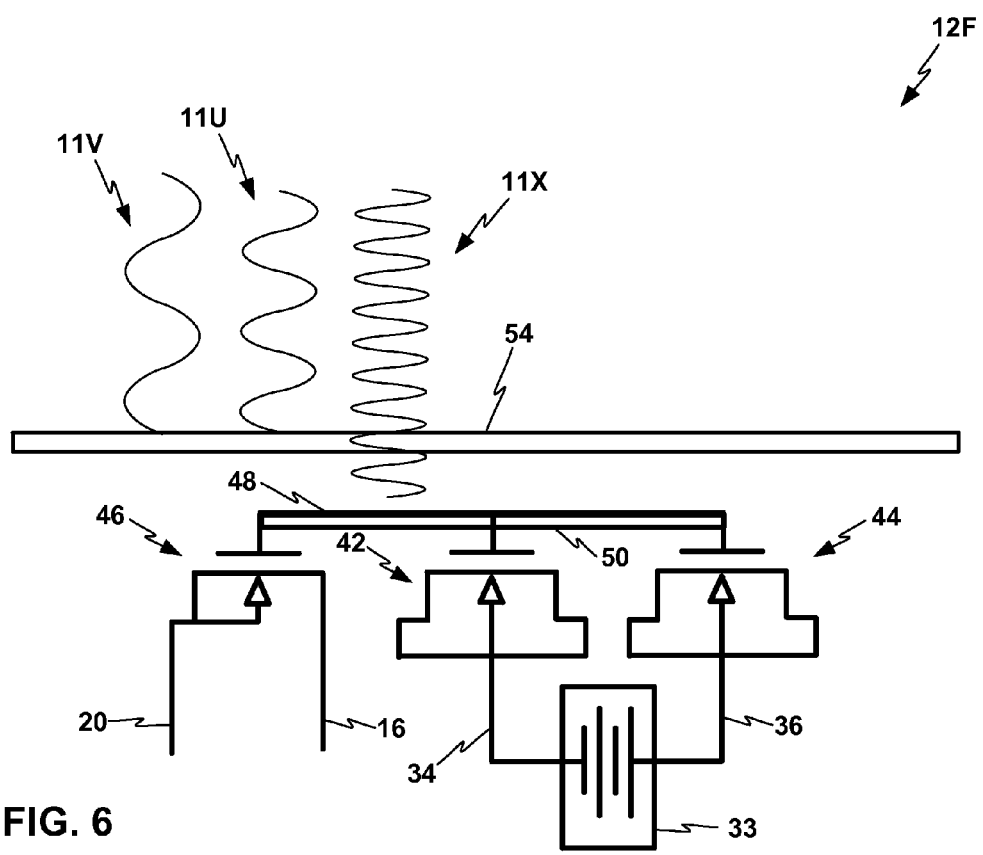
FIG. 6 is a circuit diagram of an illustrative example of a radiation sensitive cell that may be part of a radiation sensitive circuit device of this disclosure.

FIG. 6 is a circuit diagram of another illustrative example of a radiation sensitive cell 12F that may be part of a radiation sensor device of this disclosure, such as radiation sensor device 10 of FIG. 1. Radiation sensitive cell 12F of FIG. 6 is similar in some ways to radiation sensitive cell 12C of FIG. 3, and with all corresponding reference numbers in common with FIG. 3. Radiation sensitive cell 12F of FIG. 6 differs in that it also includes a frequency-selective filter 54 positioned over floating gate 48, where frequency-selective filter 54 has a different frequency response profile from frequency-selective filter 52 of FIG. 5, as detailed below.

Frequency-selective shield 54 may also be implemented as a filter, a reflective coating, a grid, any combination of the above, or any other implementation. Frequency-selective shield 54 is one way in which a radiation sensitive cell of this disclosure may be tailored to be sensitive and responsive only to certain kinds of radiation, and not sensitive to other kinds, so that the radiation sensitive cell provides a voltage response for charging a floating gate or otherwise varying an output voltage in response to selected or qualified types of radiation, and not to other types.

For example, radiation sensitive cell 12F may alternately be exposed to visible light radiation 11V, soft ultraviolet radiation 11U, and hard ultraviolet radiation 11X, at various times or at the same time. As shown in the example of FIG. 5, the particular frequency-selective shield 54 used in radiation sensitive cell 12F is opaque to visible light radiation 11V and soft ultraviolet radiation 11U, but is transparent to hard ultraviolet radiation 11X. For example, frequency-selective shield 54 may be made of a metal that is opaque to visible light radiation and soft ultraviolet radiation, but that may be penetrated by hard ultraviolet radiation. This particular configuration of radiation sensitive cell 12F may be included in a radiation sensor device for which it is desired to track the cumulative exposure of the cumulative dose radiation sensor device to hard ultraviolet radiation, such as to track germicidal UVC exposure to ensure a sufficient germicidal dose, without potential interference from visible or soft ultraviolet radiation. There may also be a particular portion of the hard ultraviolet frequency range that frequency-selective shield 54 is configured to admit selectively, such as UVC rays of approximately 100 to 280 nanometers in wavelength, while blocking out the portion of the ultraviolet range that is not applicable to the dosage being measured (such as soft ultraviolet rays of lower energy that do not significantly contribute to a germicidal function), for example.

Frequency-selective shield 54 may therefore prevent radiation incident on radiation sensitive cell 12F that is outside a frequency range of interest from intercepting floating gate 48 or having a chance to affect the charge carriers on floating gate 48. In other examples, a variety of other means may be used for ensuring that floating gate 48 is only selectively discharged by incident radiation having frequencies or energy levels of interest, while floating gate 48 remains unaffected by other radiation. While the particular example of FIG. 6 depicts a frequency-selective shield 54 that is configured to block visible and soft ultraviolet light but admit hard ultraviolet radiation, other examples may use means to admit or block any one or more portions of the electromagnetic spectrum and/or other forms of radiation, such as cosmic rays. In various examples, therefore, the resistance applied by radiation sensitive cell 12F between the ground terminal 16 and the cell output terminal 20 varies in response to radiation of a first frequency range discharging the floating gate 48, while radiation of a second frequency range does not discharge the floating gate 48.

A similar effect may be implemented in the floating gate 48 itself, such that floating gate 48 is inherently only responsive to incident radiation of certain frequency ranges, and only discharges electrons when exposed to radiation of those certain frequency ranges, while not discharging electrons when exposed to radiation of other frequency ranges. For example, various implementations of floating gate 48 may discharge electrons when exposed to ultraviolet light, X-rays, gamma rays, or cosmic rays, but not when exposed to visible light. In other implementations, floating gate 48 may discharge electrons when exposed to visible light, ultraviolet light, X-rays, gamma rays, or cosmic rays, but not when exposed to infrared light, microwaves, or radio waves. These response profiles may be implemented in part in the form of the materials and dimensions of the floating gate and its boundaries or the thickness of insulating layer 50, for example. Floating gate 48 may therefore be sensitive to a first frequency range of radiation and not be sensitive to a second frequency range of radiation, and radiation sensitive cell 12F may vary in resistance between the ground terminal 16 and the output terminal 20 in cumulative response only to radiation in the first frequency range discharging the floating gate 48.

The frequency profile of radiation sensitive cell 12F may be useful for various contexts. For example, a designing engineer may want to embed an integrated circuit in a medical device, a medicine packaging, or a food safety device that is intended to be exposed to a certain threshold dose of ultraviolet radiation to ensure that it is sterilized, before a medical device is implanted in a human body, or before medicine in the medicine packaging is administered to a patient, or before food packaged with the food safety device is provided for human consumption. In another example, a radiation sensitive cell analogous in some ways to radiation sensitive cells 12E or 12F may be tailored to be sensitive only to ultraviolet radiation, and potentially specifically to a narrower section of the ultraviolet spectrum intended for the specific use case, such as ultraviolet radiation of the ultraviolet C (UVC) range of between approximately 100 and 280 nanometers for germicidal use, for example, and not to any radiation of higher or lower energies, thereby preventing any interference by any other type of radiation.

A radiation sensor device incorporating this ultraviolet-only radiation sensitive cell may be configured to measure a dose of ultraviolet light, and signal once it has been exposed to a selected amount of ultraviolet light, indicating that the medical device, medicine packaging, or food safety device has been exposed to sufficient ultraviolet radiation to sterilize it and render it safe to proceed, in these examples. Specifically, in the context of FIG. 1, the radiation sensitive cell 12 may signal to controller 62 that it has been exposed to the selected amount of ultraviolet light in the form of delivering an oscillation frequency that has altered by at least a selected threshold from its initial oscillation frequency, as recorded in reference count entry 73 in memory component 72.

Additionally, a radiation sensor device may include multiple different kinds of radiation sensitive cells together in the same device, including any combination of radiation sensitive cells 12B, 12C, 12E, 12F, and the other variations indicated above, to track any of various different frequency ranges independently.

Figure 7:
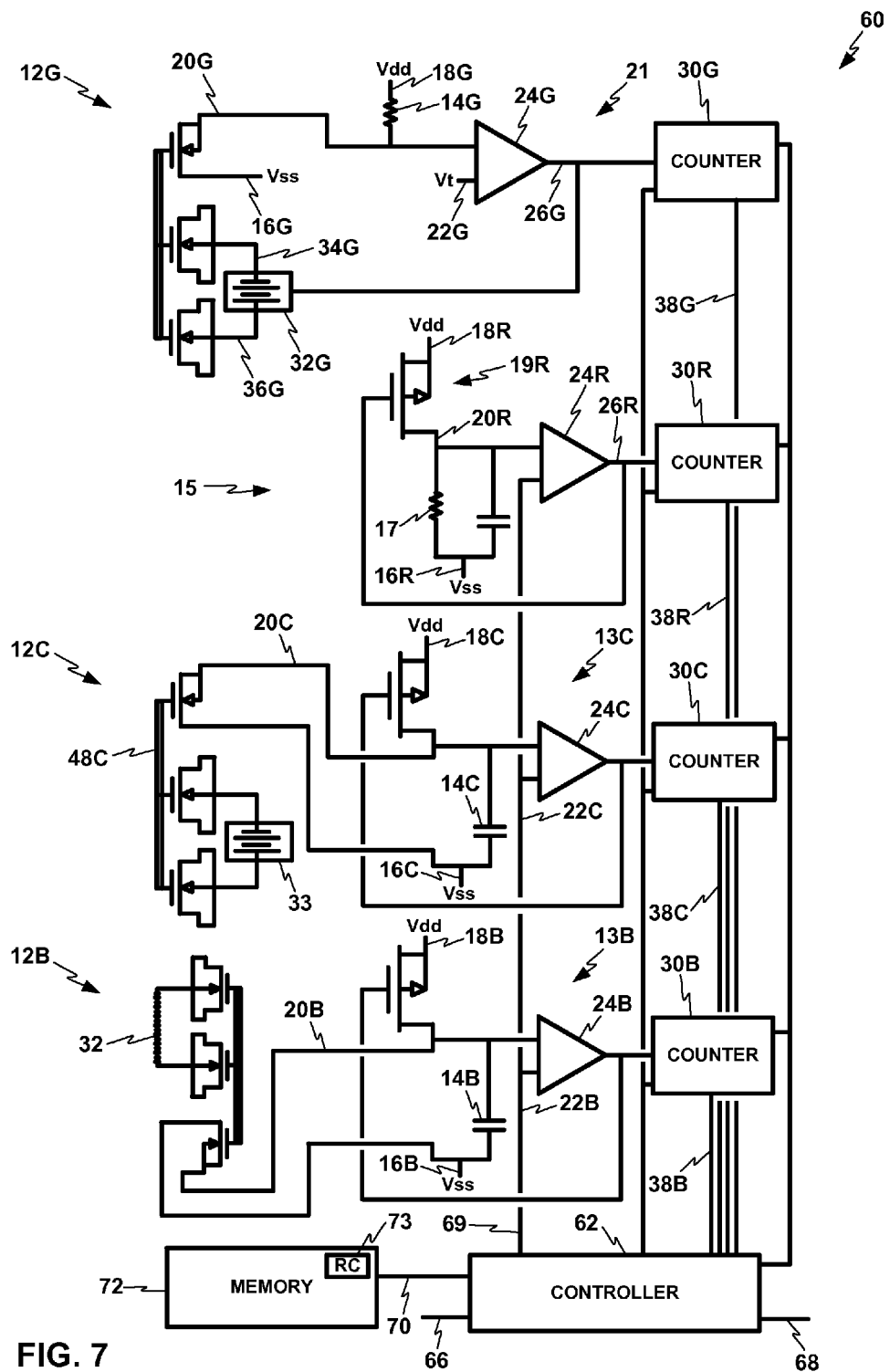
FIG. 7 is a circuit diagram of an illustrative example of a radiation sensitive circuit device of this disclosure.

FIG. 7 is a circuit diagram of an illustrative example of a radiation sensor device 60 of this disclosure. Radiation sensor device 60 of FIG. 7 is similar in some of its elements to radiation sensor device 10 of FIG. 1 as well as radiation sensitive cells 12B and 12C of FIGS. 2 and 3, and all the reference numbers shared in common among FIGS. 1, 2, 3, and 7 refer to the identical elements in FIG. 7. Certain reference numbers applied in FIGS. 1, 2, 3 are also applicable in FIG. 7 with a "B" or "C" appended thereto to refer specifically to a corresponding element in radiation sensitive oscillators 13B and 13C, respectively, such as cell output terminal 20B in radiation sensitive oscillator 13B and cell output terminal 20C in radiation sensitive oscillator 13C, for example.

Radiation sensor device 60 in the example of FIG. 7 also particularly incorporates example radiation sensitive cells 12B and 12C of FIGS. 2 and 3 for two separate and complementary implementations of radiation sensitive cell 12 in two separate and complementary implementations of radiation sensitive oscillators 13B and 13C, respectively, thereby providing radiation sensor device 60 with multiple capabilities for radiation sensitive response. Radiation sensor device 60 in the example of FIG. 7 also includes a reference oscillator 15, and a cumulative dose radiation sensor 21, which provides an additional mechanism of radiation sensing that is further complementary to radiation sensitive oscillators 13B and 13C.

Radiation sensor device 60 of FIG. 7 also includes a controller 62 and a memory component 72, with various connections among these components and the other elements of cumulative dose radiation sensor device 60. Controller 62, memory component 72, and the rest of cumulative dose radiation sensor device 60 may all form part or all of an integrated circuit, for example. The integrated circuit may also include any of a number of other components, potentially including additional memory components, for example.

Radiation sensitive oscillators 13B and 13C may each be sensitive to different types of radiation, and may each respond independently to incident radiation of the types to which they are sensitive. Controller 62 may record initial readings of the oscillation frequency of each of radiation sensitive oscillators 13B and 13C, in comparison with a simultaneous reference reading from reference oscillator 15 to define the duration of time over which the oscillation frequencies of radiation sensitive oscillators 13B and 13C are recorded. Controller 62 may subsequently take additional readings of the oscillation frequencies of radiation sensitive oscillators 13B and 13C and compare each one to the initial oscillation frequency or another earlier oscillation frequency from each respective radiation sensitive oscillator, and thereby detect whether or how much radiation of each of a number of different types of radiation have been incident on radiation sensor device 60 since the initial or other prior reading.

While radiation sensor device 60 is depicted with two radiation sensitive oscillators 13B and 13C, this is an illustrative example, and other implementations of a radiation sensor device may include three, four, or any number of radiation sensitive oscillators, each one of which may be tailored to a different frequency range or range of energies of incident radiation. By comparing the readings from any or all of these radiation sensitive oscillators, controller 62 may be configured to characterize a history of incident radiation with up to arbitrarily levels of detail in the types and frequency ranges of the incident radiation.

As indicated above, radiation sensor device 60 also includes a cumulative dose radiation sensor 21. Cumulative dose radiation sensor 21 includes a radiation sensitive cell 12G. Cumulative dose radiation sensor 21 tracks longer-term cumulative doses of radiation relative to radiation sensitive oscillators 12B and 12C, and complements radiation sensitive oscillators 12B and 12C by being specialized for independently tracking cumulative doses of radiation over the long term, while radiation sensitive oscillators 12B and 12C are specialized for responding to shorter term incidences of radiation with finer sensitivity. Cumulative dose radiation sensor 21 shares some elements in common with radiation sensitive oscillators 13B and 13C, but is not an oscillator and includes some significant differences that result in implementing a different functionality, as is detailed below. In particular, cumulative dose radiation sensor 21 includes radiation sensitive cell 12G that is analogous in many ways to radiation sensitive cell 12C, but the rest of the structure of cumulative dose radiation sensor 21 has several differences from radiation sensitive oscillator 13C. Radiation sensitive cell 12G may be implemented in any of the ways described with reference to radiation sensitive cells 12C and 12D of FIGS. 3 and 4, and any of the description with reference to radiation sensitive cells 12C and 12D of FIGS. 3 and 4 may be applicable to radiation sensitive cell 12G as well.

In particular, radiation sensitive cell 12G may be sensitive to any one or more of a variety of types, frequencies, energies, or wavelengths of radiation. Radiation sensitive cell 12G may be configured to be set to an initial electrical resistance, and to vary in resistance cumulatively in response to radiation incident on radiation sensitive cell 12G, for radiation of an energy to which radiation sensitive cell 12G is sensitive. Radiation sensitive cell 12G may vary in resistance cumulatively in response to incident radiation in that radiation sensitive cell 12G varies in resistance proportionally to the amount of radiation that strikes radiation sensitive cell 12G, for at least a certain amount of radiation and over at least a certain range of resistance.

For example, radiation sensitive cell 12G may be set to an initial resistance, and then, if radiation sensitive cell 12G is exposed to a first dose of radiation, its resistance may change to a second value of resistance. If radiation sensitive cell 12G is later exposed to a second dose of radiation, its resistance may change to a third value of resistance. If one of the doses of radiation has a longer duration or higher intensity, or otherwise has a higher total energy, the resistance of radiation sensitive cell 12G may change by a greater amount. Radiation sensitive cell 12G may continue to vary in resistance in response to cumulative doses of radiation. The rate of change of resistance of radiation sensitive cell 12G in response to incident radiation is not necessarily the same across its entire range of variability, i.e., the rate of change of resistance may increase or decrease in response to the same dose of radiation depending on where in the range of variability the resistance is, in some examples. Radiation sensitive cell 12G may be sensitive to any one or more of a variety of types, frequencies, energies, or wavelengths of radiation.

Radiation sensitive cell 12G also includes a ground terminal 16G and a cell output terminal 20G both connected to the radiation sensitive cell 12G, in the example of FIG. 1. Cell output terminal 20G may be configured to vary in voltage in response to the resistance of the radiation sensitive cell 12G. In particular, cell output terminal 20G may be connected to source voltage terminal 18G through a reference resistor 14G, while cell output terminal 20G is also connected to ground terminal 16G through radiation sensitive cell 12G in a way that applies the varying resistance of radiation sensitive cell 12G to the electrical connection between cell output terminal 20G and ground terminal 16G. Therefore, as the resistance of radiation sensitive cell 12G varies, the voltage of cell output terminal 20 also varies as a function of the varying of the resistance of radiation sensitive cell 12G, in this example. In particular, in this example, the variable voltage Vv of cell output terminal 20G as a function of the variable resistance Rs of radiation sensitive cell 12G may take the form of Equation 1:

$$Vv = Vdd*Rs/(Rs+Rr) \quad \text{(Eq. 1)}$$

As in FIG. 1, source voltage terminal 18 is labeled "Vdd" and ground terminal 16 is labeled "Vss". Source voltage terminal 18 and ground terminal 16G may be connected to the same source voltage and ground as the corresponding source voltage and ground terminals of radiation sensitive oscillators 13B and 13C and reference oscillator 13R.

Cumulative dose radiation sensor 21 also includes a comparator 24G, which is connected to cell output terminal 20G and a threshold voltage Vt on a second comparator input terminal 22G for its two inputs. Comparator 24G is configured to provide an output signal on comparator signal terminal 26G in response to the voltage of the cell output terminal 20G reaching a certain threshold voltage. That threshold voltage is the threshold voltage Vt on the second comparator input terminal 22G, in this example, so that when the variable voltage Vv of cell output terminal 20G reaches or crosses the threshold voltage Vt on the second comparator input terminal 22G, the comparator 24G provides the output signal on comparator signal terminal 26G.

In some examples, the resistance Rs of radiation sensitive cell 12G may be set to an initial resistance that is relatively low, and the voltage of cell output terminal 20G may also have an initial value that is close to the voltage Vss, which may be lower than the threshold voltage Vt. In these examples, the resistance Rs of radiation sensitive cell 12G may be configured to increase cumulatively as it is struck by incident radiation, and the voltage of cell output terminal 20G may correspondingly increase toward Vdd in response to the increasing of the resistance Rs of radiation sensitive cell 12G. If a certain threshold amount of cumulative radiation strikes radiation sensitive cell 12G, it may drive the voltage of cell output terminal 20G above the threshold voltage Vt on the second comparator input terminal 22G, which may cause comparator 24G to provide the output signal on comparator signal terminal 26G.

Therefore, cumulative dose radiation sensor 21 provides one count to counter 30G once cumulative dose radiation sensor 21 has accumulated a certain cumulative dose of radiation on radiation sensitive cell 12G.

In other examples, the resistance Rs of radiation sensitive cell 12G may be set to an initial resistance that is relatively high, and the voltage of cell output terminal 20G may also have an initial value (when radiation sensor device 60 is powered) that is close to the source voltage Vdd, which may be higher than the threshold voltage Vt. In these examples, the resistance Rs of radiation sensitive cell 12G may be configured to decrease cumulatively as it is struck by incident radiation, and the voltage of cell output terminal 20G may correspondingly decrease toward the drain voltage Vss in response to the decreasing of the resistance Rs of radiation sensitive cell 12G. If a certain threshold amount of cumulative radiation strikes radiation sensitive cell 12G, it may drive the voltage of cell output terminal 20G below the threshold voltage Vt on the second comparator input terminal 22G (when radiation sensor device 60 is powered), which may cause comparator 24G to provide the output signal on comparator signal terminal 26G.

Therefore, cumulative dose radiation sensor 21 provides one count to counter 30G once cumulative dose radiation sensor 21 has accumulated a certain cumulative dose of radiation on radiation sensitive cell 12G. In various of these examples, cumulative dose radiation sensor 21 thereby defines a threshold amount of radiation that may be cumulatively received by radiation sensitive cell 12G before comparator 24G provides its output signal to counter 30G.

Additionally, comparator signal terminal 26G connects the signal output of comparator 24G to a cell charging circuit 32G that is included in radiation sensitive cell 12G. The cell charging circuit 32 may be configured to recharge and reset the radiation sensitive cell 12G to its initial resistance in response to the output signal from the comparator 24G. Cell charging circuit 32G may illustratively be connected to radiation sensitive cell 12G via two charging terminals 34G and 36G in this example. Cell charging circuit 32G may be enabled to reset the radiation sensitive cell 12G back to its initial resistance, and thereby also to cause cell output terminal 20G to return to its initial voltage (when radiation sensor device 60 is powered).

Counter 30G may be configured to count a number of times the comparator 24G provides the output signal via comparator signal terminal 26G. Counter 30G may count one count for the first time comparator 24G provides the output signal, while cell charging circuit 32G also resets radiation sensitive cell 12G to its initial resistance. If radiation sensitive cell 12G subsequently receives enough radiation cumulatively to add up to the threshold amount of radiation once again, i.e., enough radiation to alter the resistance Rs of radiation sensitive cell 12G and the voltage Vv of cell output terminal 20G enough to reach the threshold voltage Vt once again, then comparator 24G repeats the process of providing the output signal via comparator signal terminal 26G to counter 30G and cell charging circuit 32G. Counter 30G may then add another count to its cumulative count of the number of times radiation sensitive cell 12G has cumulatively received the threshold amount of radiation. Cell charging circuit 32G may also once again reset radiation sensitive cell 12G to the initial resistance, and thereby also reset the voltage of cell output terminal 20G to its initial voltage, thereby configuring cumulative dose radiation sensor 21 to continue responding to and counting the number of times radiation sensitive cell 12G cumulatively receives the threshold dose of radiation.

Cumulative dose radiation sensor 21 may enable the varying of the resistance Rs of radiation sensitive cell 12G cumulatively in response to incident radiation to be performed regardless of whether radiation sensitive cell 12G is powered as it tracks the cumulative dose of radiation. When radiation sensor device 60 is unpowered, source voltage terminal 18G may be at zero voltage instead of at the source voltage Vdd, and cell output terminal 20G may be at zero voltage instead of a voltage dependent on the resistance Rs of radiation sensitive cell 12G, while second comparator input terminal 22G may also be at zero voltage instead of at the threshold voltage Vt. However, radiation sensitive cell 12G may nonetheless retain any changes to its resistance Rs that records its cumulative dose of incident radiation, regardless of whether or not radiation sensor device 60 is powered or unpowered at various times, and regardless of whether the voltages of source voltage terminal 18G or other terminals in radiation sensor device 60 temporarily go to zero while radiation sensor device 60 is unpowered.

If cumulative dose radiation sensor device 10 has been unpowered and the voltages of source voltage terminal 18G and second comparator input terminal 22G have been at zero, and then radiation sensor device 60 is powered up, cumulative dose radiation sensor 21 may perform its comparison of the voltage of cell output terminal 20G with the threshold voltage Vt at second comparator input terminal 22G rapidly in response to the return of power and voltage. With normal source voltage Vdd restored to source voltage terminal 18G, cell output terminal 20G goes to a voltage that is a function of and that signals the current level of the resistance Rs of radiation sensitive cell 12G. With the second comparator input terminal 22G also returned to the threshold voltage Vt, comparator 24G then responds appropriately to whether the voltage of cell output terminal 20G has reached or crossed the threshold voltage Vt of the second comparator input terminal 22G. Comparator 24G therefore provides the output signal on comparator signal terminal 26G if radiation sensitive cell 12G has received the threshold amount of radiation cumulatively over time, since radiation sensitive cell 12G was initially set or reset to its initial voltage.

Controller 62 may receive the count from counter 30G via terminal 38G, and use the information it thereby gains from cumulative dose radiation sensor 21 as another source of data that complements the data controller 62 receives from radiation sensitive oscillators 13B and 13C. If radiation sensitive cell 12G is implemented with a similar range of frequencies or energies of qualifying radiation as radiation sensitive cells 12B and/or 12C of radiation sensitive oscillators 13B and 13C, it may be expected that controller 62 will receive much lower counts from cumulative dose radiation sensor 21 as from radiation sensitive oscillators 13B or 13C. Controller 62 may use cumulative dose radiation sensor 21 as a longer term tracker of a cumulative dose of qualifying radiation, while controller 62 uses radiation sensitive oscillators 13B and 13C for detecting whether radiation sensor device 60 has recently been exposed to qualifying radiation in the shorter term.

For example, controller 62 may be configured to run readings of radiation sensitive oscillators 13B and 13C as part of a boot-up procedure whenever radiation sensor device 60 is powered up again after being unpowered, and/or at regular intervals while radiation sensor device 60 is powered up, and compare the new instances of the readings from radiation sensitive oscillators 13B and 13C with initial instances of these readings, or with any intervening instances of these readings. Controller 62 may also simply read the count from cumulative dose radiation sensor 21, and may potentially also make comparisons between the readings from radiation sensitive oscillators 13B and 13C and the count from cumulative dose radiation sensor 21. Controller 62 may be configured to respond to any combination of instances of the counts from radiation sensitive oscillators 13B and 13C and cumulative dose radiation sensor 21 by performing a selected action, such as alerting the system that sufficient radiation was experienced while the power was off to affect the reliability of the data stored in its flash memory, for example.

Figure 8:
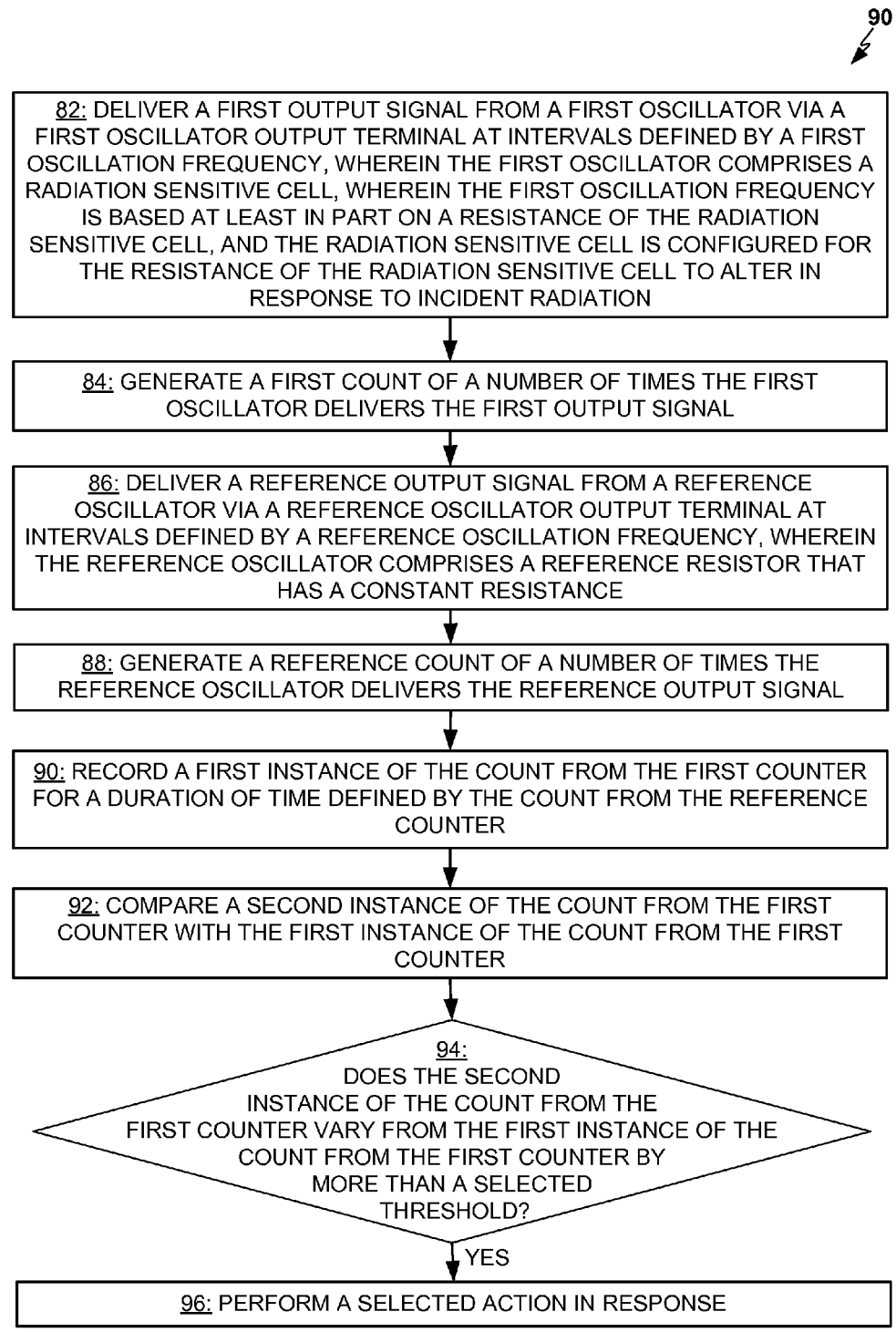
FIG. 8 is a flowchart of an illustrative example of a process for radiation sensing with a radiation sensitive circuit device of this disclosure.

FIG. 8 is a flowchart of an illustrative example of a process 80 for sensing radiation with a radiation sensor device of this disclosure, such as radiation sensor devices 10 or 60 of FIGS. 1 and 7. Process 80 may be performed by, implemented in, or embodied in a device configured for carrying out process 80 or portions thereof, which may include any of the devices depicted in FIGS. 1-7 and described above with reference thereto. Reference numerals from FIGS. 1-7 are also used below to indicate representative examples of how various elements of process 80 may relate to the devices of FIGS. 1-7.

In process 80, a device may deliver a first output signal from a first oscillator, such as oscillator 13 of FIG. 1 or 7, via a first oscillator output terminal at intervals defined by a first oscillation frequency, wherein the first oscillator includes a radiation sensitive cell, such as any of radiation sensitive cells 12, 12B, 12C, 12D, 12E, or 12F of FIGS. 1-7, wherein the first oscillation frequency is based at least in part on a resistance of the radiation sensitive cell, and the radiation sensitive cell is configured for the resistance of the radiation sensitive cell to alter in response to incident radiation (82). The device may generate a first count of a number of times the first oscillator delivers the first output signal, such as with any of counters 30, 30B, or 30C of FIGS. 1 and 7 (84).

The device may also deliver a reference output signal from a reference oscillator, such as reference oscillator 15 of FIG. 1 or 7, via a reference oscillator output terminal at intervals defined by a reference oscillation frequency, wherein the reference oscillator includes a reference resistor that has a constant resistance, such as reference resistor 17 of FIG. 1 or 7 (86). The device may generate a reference count of a number of times the reference oscillator 15 delivers the reference output signal, such as with counter 30R of FIG. 1 or 7 (88).

The device may then record, such as with controller 62 in memory component 72 as in FIG. 1 or 7, a first instance of the count from the first counter for a duration of time defined by the count from the reference counter (90). The device may subsequently compare, such as with controller 62 in FIG. 1 or 7, a second instance of the count from the first counter with the first instance of the count from the first counter (92). The device may then evaluate whether the second instance of the count from the first counter varies from the first instance of the count from the first counter by more than a selected threshold (94). The device may then perform a selected action in response to the second instance of the count from the first counter varying from the first instance of the count from the first counter by more than a selected threshold (96).

Controller 62 may be implemented as any of a variety of types of circuit elements, such as a central processing unit (CPU), a field programmable gate array (FPGA), an application-specific integrated circuit (ASIC), a microcontroller, a programmable logic controller (PLC), a subsection of any of the above, an interconnected or distributed combination of any of the above, or any other type of component or one or more components capable of being configured to carry out the functions attributed herein to controller 62.

The techniques described herein may be able to produce integrated circuits that implement logic using a CMOS process technology. The circuit components described in this disclosure can be implemented as discrete components, as one or more elements of one or more integrated devices, or any combination thereof The circuit components described herein may be fabricated using any of a wide variety of process technologies including CMOS process technologies, including either standard or custom CMOS process technologies. In addition, the circuitry described herein may be used in various applications including telecommunications applications, general computing application, or any application that may make use of an integrated radiation sensor.

Various aspects of the disclosure have been described. These and other aspects are within the scope of the following claims.

The invention claimed is:

1. A device comprising:
   a first oscillator, configured to deliver a first output signal via a first oscillator output terminal at intervals defined by a first oscillation frequency, wherein the first oscillator comprises a radiation sensitive cell, wherein the first oscillation frequency is based at least in part on a resistance of the radiation sensitive cell, and the radiation sensitive cell is configured for the resistance of the radiation sensitive cell to alter in response to incident radiation, wherein the radiation sensitive cell comprises one or more photodiodes and a floating gate that is configured to be charged via the one or more photodiodes;
   a first counter, connected to the first oscillator output terminal and configured to generate a first count of a number of times the first oscillator delivers the first output signal;
   a reference oscillator, configured to deliver a reference output signal via a reference oscillator output terminal at intervals defined by a reference oscillation frequency;
   a reference counter, connected to the reference oscillator output terminal and configured to generate a reference count of a number of times the reference oscillator delivers the reference output signal;
   a controller, operably connected to the first counter and the reference counter; and
   a memory component, operably connected to the controller;
   wherein the controller is configured to:
      record in the memory component a first instance of the count from the first counter for a duration of time defined by the count from the reference counter;
      compare a second instance of the count from the first counter with the first instance of the count from the first counter; and
      perform a selected action in response to the second instance of the count from the first counter varying from the first instance of the count from the first counter by more than a selected threshold.

2. The device of claim 1, wherein the selected action the controller is configured to perform in response to the second instance of the count from the first counter varying from the first instance of the count from the first counter by more than a selected threshold comprises refreshing data in a flash memory component.

3. The device of claim 1, wherein the selected action the controller is configured to perform in response to the second instance of the count from the first counter varying from the first instance of the count from the first counter by less than a selected threshold comprises alerting the system that an insufficient level of radiation has been delivered to a target to ensure that a specified purpose has been accomplished.

4. The device of claim 1, wherein the selected action the controller is configured to perform in response to the second instance of the count from the first counter varying from the first instance of the count from the first counter by more than a selected threshold comprises signaling to an external component that the second instance of the count from the first counter varies from the first instance of the count from the first counter by more than the selected threshold.

5. The device of claim 1, wherein the selected threshold is zero.

6. The device of claim 1, wherein the one or more photodiodes comprises a plurality of photodiodes in series.

7. The device of claim 1, wherein the radiation sensitive cell comprises a floating gate and a metal oxide semiconductor (MOS) tunneling capacitor, wherein the floating gate is configured to be charged via the MOS tunneling capacitor, and the radiation sensitive cell is set to an initial resistance when the floating gate is charged to an initial charge.

8. The device of claim 7, wherein the floating gate is configured to be discharged in response to incident radiation, wherein the radiation sensitive cell alters in resistance as a function of the floating gate being discharged in response to the incident radiation.

9. The device of claim 1, wherein the radiation sensitive cell comprises a MOSFET transistor comprising a floating gate, a gate capacitor, a ground terminal, and an output terminal, wherein the cell varies in resistance between the ground terminal and the output terminal in cumulative response to radiation discharging the floating gate.

10. The device of claim 9, wherein the floating gate is sensitive to a first frequency range of radiation and is not sensitive to a second frequency range of radiation, wherein the cell varies in resistance between the ground terminal and the output terminal in cumulative response to radiation in the first frequency range discharging the floating gate.

11. The device of claim 9, wherein the radiation sensitive cell comprises a single-polysilicon EEPROM cell formed with a standard CMOS process, and wherein the floating gate capacitor, the tunneling capacitor, and the control capacitor are formed from a single polysilicon layer.

12. The device of claim 1, wherein the first oscillator is a first radiation sensitive oscillator, the device further comprising a second radiation sensitive oscillator, wherein the first radiation sensitive oscillator is sensitive to a first frequency range of radiation and the second radiation sensitive oscillator is sensitive to a second frequency range of radiation, and the device comprises a second counter, connected to a second radiation sensitive oscillator output terminal and configured to generate a first count of a number of times the second radiation sensitive oscillator delivers a second output signal; wherein the controller is further configured to:

record in the memory component a first instance of the count from the second radiation sensitive counter for a duration of time defined by the count from the reference counter;

compare a second instance of the count from the second radiation sensitive counter with the first instance of the count from the second radiation sensitive counter; and perform a selected action in response to either the second instance of the count from the first counter varying from the first instance of the count from the first counter by more than a first selected threshold, or the second instance of the count from the second counter varying from the first instance of the count from the second counter by more than a second selected threshold.

13. An integrated circuit comprising:

a first oscillator, configured to deliver a first output signal via a first oscillator output terminal at intervals defined by a first oscillation frequency, wherein the first oscillator comprises a radiation sensitive cell, wherein the first oscillation frequency is based at least in part on a resistance of the radiation sensitive cell, and the radiation sensitive cell is configured for the resistance of the radiation sensitive cell to alter in response to incident radiation, wherein the radiation sensitive cell comprises one or more photodiodes and a floating gate that is configured to be charged via the one or more photodiodes;

a first counter, connected to the first oscillator output terminal and configured to generate a first count of a number of times the first oscillator delivers the first output signal;

a reference oscillator, configured to deliver a reference output signal via a reference oscillator output terminal at intervals defined by a reference oscillation frequency;

a reference counter, connected to the reference oscillator output terminal and configured to generate a reference count of a number of times the reference oscillator delivers the reference output signal;

a controller, operably connected to the first counter and the reference counter; and a memory component, operably connected to the controller;

wherein the controller is configured to:

record in the memory component a first instance of the count from the first counter for a duration of time defined by the count from the reference counter;

compare a second instance of the count from the first counter with the first instance of the count from the first counter; and perform a selected action in response to the second instance of the count from the first counter varying from the first instance of the count from the first counter by more than a selected threshold.

14. The integrated circuit of claim 13, wherein the one or more photodiodes comprises a plurality of photodiodes in series.

15. The integrated circuit of claim 13, wherein the radiation sensitive cell comprises a floating gate and a metal oxide semiconductor (MOS) tunneling capacitor, wherein the floating gate is configured to be charged via the MOS tunneling capacitor, the radiation sensitive cell is set to an initial resistance when the floating gate is charged to an initial charge, and the floating gate is configured to be discharged in response to incident radiation, wherein the radiation sensitive cell alters in resistance as a function of the floating gate being discharged in response to the incident radiation.

16. The integrated circuit of claim 13, wherein the radiation sensitive cell comprises a MOSFET transistor comprising a floating gate, a gate capacitor, a ground terminal, and an output terminal, wherein the radiation sensitive cell varies in resistance between the ground terminal and the output terminal in cumulative response to radiation discharging the floating gate.

17. A method comprising:

delivering a first output signal from a first oscillator via a first oscillator output terminal at intervals defined by a first oscillation frequency, wherein the first oscillator comprises a radiation sensitive cell, wherein the first oscillation frequency is based at least in part on a resistance of the radiation sensitive cell, and the radiation sensitive cell is configured for the resistance of the radiation sensitive cell to alter in response to incident radiation, wherein the radiation sensitive cell comprises one or more photodiodes and a floating gate that is configured to be charged via the one or more photodiodes;

generating a first count of a number of times the first oscillator delivers the first output signal;

delivering a reference output signal from a reference oscillator via a reference oscillator output terminal at intervals defined by a reference oscillation frequency;

generating a reference count of a number of times the reference oscillator delivers the reference output signal;

recording a first instance of the count from the first counter for a duration of time defined by the count from the reference counter;

comparing a second instance of the count from the first counter with the first instance of the count from the first counter; and performing a selected action in response to the second instance of the count from the first counter varying from the first instance of the count from the first counter by more than a selected threshold.

18. The method of claim 17, wherein performing the selected action comprises erasing data from a memory component.

19. The method of claim 17, wherein performing the selected action comprises disabling an integrated circuit in which the device is comprised.

* * * * *